United States Patent
Kuwabara

(10) Patent No.: US 7,092,795 B2
(45) Date of Patent: Aug. 15, 2006

(54) TURBINE APPARATUS AND GOVERNOR FOR TURBINE

(75) Inventor: Takao Kuwabara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 503 days.

(21) Appl. No.: 10/677,479

(22) Filed: Oct. 3, 2003

(65) Prior Publication Data

US 2004/0115048 A1    Jun. 17, 2004

(30) Foreign Application Priority Data

Oct. 4, 2002 (JP) ............................. 2002-291809

(51) Int. Cl.
```
G05D 11/00    (2006.01)
G05D 7/00     (2006.01)
G05D 3/12     (2006.01)
G05D 5/00     (2006.01)
G05D 9/00     (2006.01)
G05D 17/00    (2006.01)
F01D 1/12     (2006.01)
F04D 5/00     (2006.01)
```
(52) U.S. Cl. .................. 700/282; 700/170; 700/287; 700/289; 700/290; 415/52.1; 415/53.1; 415/55.1; 415/80; 323/304; 323/318; 318/798; 318/799

(58) Field of Classification Search ............... 700/159, 700/170, 173, 282, 289, 290, 304, 286, 287; 415/22, 52.1, 53.1, 53.3, 55.1, 55.6, 70, 71, 415/80; 318/798–799; 323/304, 318
See application file for complete search history.

(56) References Cited

U.S. PATENT DOCUMENTS

| | | | | | |
|---|---|---|---|---|---|
| 4,625,125 | A * | 11/1986 | Kuwabara | ..................... | 290/52 |
| 4,754,156 | A * | 6/1988 | Shiozaki et al. | .............. | 290/52 |
| 5,090,872 | A * | 2/1992 | Kuwabara et al. | ............. | 417/53 |
| 5,561,358 | A * | 10/1996 | Kuwabara et al. | .......... | 318/799 |
| 6,250,887 | B1* | 6/2001 | Kuwabara et al. | ............. | 417/26 |
| 6,846,154 | B1* | 1/2005 | Kuwabara | ....................... | 415/1 |

FOREIGN PATENT DOCUMENTS

JP     2002-303244     10/2002

* cited by examiner

Primary Examiner—Ramesh Patel
(74) Attorney, Agent, or Firm—McDermott Will & Emery LLP

(57) ABSTRACT

In a turbine apparatus comprising a runner rotatable to be rotationally driven by a water, a gain of a derivative calculation element generating a derivative component of a control signal for controlling a flow rate of the water which derivative component is to be applied to the derivative calculation element and the integration calculation element by performing differentiation on a difference between an actual rotational speed and a desired rotational speed of the runner with respect to a time proceeding has a value sufficiently increased to converge a value of the control signal toward a desired value in accordance with the time proceeding in S-characteristic portion.

20 Claims, 13 Drawing Sheets

RELATIONSHIP BETWEEN N1 AND Q1
IN PUMP TURBINE MODEL

RELATIONSHIP BETWEEN N1 AND T1
IN PUMP TURBINE MODEL

START IN S-CHARACTERISTIC PORTION BY PRIOR ART

START IN S-CHARACTERISTIC PORTION BY PRIOR ART

START IN S-CHARACTERISTIC PORTION BY PRIOR ART

START IN S-CHARACTERISTIC PORTION BY PRIOR ART

ANALYSIS ON EMBODIMENT OF INVENTION (1)

ANALYSIS ON EMBODIMENT OF INVENTION (2)

ANALYSIS ON EMBODIMENT OF INVENTION (5)

TIME (s)

ANALYSIS ON EMBODIMENT OF INVENTION (6)

TIME (s)

ANALYSIS ON EMBODIMENT OF INVENTION (7)

ANALYSIS ON EMBODIMENT OF INVENTION (8)

(a)

(b)

TURBINE APPARATUS AND GOVERNOR FOR TURBINE

BACKGROUND OF THE INVENTION

The present invention relates to a turbine apparatus especially of low specific speed including a turbine runner and a governor for controlling a rotational speed of the turbine runner.

Generally in a turbine apparatus of low specific speed, so-called S characteristics as shown in FIGS. 1A and 1B occur, and the turbine apparatus is controlled as disclosed by JP-A-2002-303244 to be restrained from being made unstable in its operation by the S characteristics.

BRIEF SUMMARY OF THE INVENTION

An object of the present invention is to provide a turbine apparatus of low specific speed and a governor for controlling a rotational speed of a turbine runner, by which the turbine runner can be rotated stably irrespective of S characteristics even when a head of a water for driving the turbine runner is low.

In a turbine apparatus to be driven by a water, comprising a runner rotatable to be rotationally driven by the water, a flow rate adjuster for adjusting a flow rate of the water to change an actual rotational speed of the runner, and a control device for generating a control signal for controlling the flow rate adjuster so that a difference between the actual rotational speed of the runner and a desired rotational speed of the runner is decreased, wherein the control device includes an input port for receiving a runner speed signal whose value corresponds to the actual rotational speed of the runner so that an input signal whose value corresponds to the difference between the actual rotational speed of the runner and the desired rotational speed of the runner is generated, a derivative calculation element for generating a derivative component of the control signal whose value corresponds to a value to be applied to the derivative calculation element and the integration calculation element by performing differentiation on the value of the input signal with respect to a time proceeding and an integration calculation element for generating an integral component of the control signal whose value corresponds to a value to be applied to the derivative calculation element and the integration calculation element by performing integration on the value of the input signal with respect to the time proceeding, and a ratio of a gain of the derivative calculation element to a gain of the integration calculation element to be applied to the derivative calculation element and the integration calculation element when the difference between the actual rotational speed of the runner and the desired rotational speed of the runner is not more than a predetermined degree is greater than a ratio of the gain of the derivative calculation element to the gain of the integration calculation element to be applied to the derivative calculation element and the integration calculation element when the difference between the actual rotational speed of the runner and the desired rotational speed of the runner is more than the predetermined degree.

Since the ratio of the gain of the derivative calculation element to the gain of the integration calculation element to be applied to the derivative calculation element and the integration calculation element when the difference between the actual rotational speed of the runner and the desired rotational speed of the runner is not more than a predetermined degree is greater than a ratio of the gain of the derivative calculation element to the gain of the integration calculation element to be applied to the derivative calculation element and the integration calculation element when the difference between the actual rotational speed of the runner and the desired rotational speed of the runner is more than the predetermined degree, even when the head of the water for driving the turbine runner is low and the actual rotational speed of the runner increases to the vicinity of the desired rotational speed of the runner so that an operating point of the runner is positioned in a so-called S-characteristic portion as defined below in the present application, the derivative component of the control signal effectively suppresses an undesirable oscillation in the rotational speed of the runner.

It is preferable for keeping an acceleration in the rotational speed of the runner from zero toward the desired rotational speed thereof not too slow that the ratio of the gain of the derivative calculation element to the gain of the integration calculation element to be applied to the derivative calculation element and the integration calculation element when the difference between the actual rotational speed of the runner and the desired rotational speed of the runner is not more than the predetermined degree is greater than a ratio of the gain of the derivative calculation element to the gain of the integration calculation element to be applied to the derivative calculation element and the integration calculation element when the difference between the actual rotational speed of the runner and the desired rotational speed of the runner is more than the predetermined degree when the head of the water for driving rotationally the runner is not more than a predetermined value, and the ratio of the gain of the derivative calculation element to the gain of the integration calculation element to be applied to the derivative calculation element and the integration calculation element when the difference between the actual rotational speed of the runner and the desired rotational speed of the runner is not more than the predetermined degree is prevented from being greater than the ratio of the gain of the derivative calculation element to the gain of the integration calculation element to be applied to the derivative calculation element and the integration calculation element when the difference between the actual rotational speed of the runner and the desired rotational speed of the runner is more than the predetermined degree, when the head of the water for driving rotationally the runner is more than the predetermined value.

It is preferable for keeping the acceleration in the rotational speed of the runner from zero toward the desired rotational speed thereof not too slow at least when Q is the flow rate of the water for driving rotationally the runner, H is the head of the water for driving rotationally the runner, N is the actual rotational speed of the runner, T is a torque for driving rotationally the runner, $N_1 = N/\sqrt{H}$, $Q_1 = Q/\sqrt{H}$, $T_1 = T/H$, $\partial Q_1/\partial N_1 \leq 0$, $\partial T_1/\partial N_1 \leq 0$, the absolute value of $\partial Q_1/\partial N_1$ is not more than a first value, and the absolute value of $\partial T_1/\partial N_1$ is not more than a second value, that is, the operating point of the runner is not in the S-characteristic portion or in the vicinity of the S-characteristic portion that the ratio of the gain of the derivative calculation element to the gain of the integration calculation element to be applied to the derivative calculation element and the integration calculation element when the difference between the actual rotational speed of the runner and the desired rotational speed of the runner is not more than the predetermined degree is greater than the ratio of the gain of the derivative calculation element to the gain of the integration calculation element to be applied to the derivative calculation element and the integration calculation element when the difference between the actual rotational speed of the runner and the desired rotational speed of the runner is more than the predetermined degree, under at least one of a case in which $\partial Q_1/\partial N_1 > 0$, a case in which $\partial T_1/\partial N_1 > 0$, a case in which an absolute value of $\partial Q_1/\partial N_1$ is more than the first value, and a case in which an absolute value of $\partial T_1/\partial N_1$ is more than the second value (that is, an operating point of the runner is in the so-called S-characteristic portion or in the vicinity of the S-characteristic portion), and the ratio of the gain of the derivative calculation element to the gain of the integration calculation element be applied to the derivative calculation element and the integration calculation element when the difference between the actual rotational speed of the runner and the desired rotational speed of the runner is not more than a predetermined degree is prevented from being greater than the ratio of the gain of the derivative calculation element to the gain of the integration calculation element to be applied to the derivative calculation element and the integration calculation element when the difference between the actual rotational speed of the runner and the desired rotational speed of the runner is more than the predetermined degree, under a case in which $\partial Q_1/\partial N_1 \leq 0$, $\partial T_1/\partial N_1 \leq 0$, the absolute value of $\partial Q_1/\partial N_1$ is not more than the first value, and the absolute value of $\partial T_1/\partial N_1$ is not more than the second value.

It is preferable for keeping the acceleration in the rotational speed of the runner from zero toward the desired rotational speed thereof not too slow at least when the difference between the actual rotational speed of the runner and the desired rotational speed of the runner is more than the predetermined degree, that during an increase of the actual rotational speed of the runner from zero toward the desired rotational speed of the runner, the ratio of the gain of the derivative calculation element to the gain of the integration calculation element applied to the derivative calculation element and the integration calculation after the difference between the actual rotational speed of the runner and the desired rotational speed of the runner becomes not more than the predetermined degree is greater than the ratio of the gain of the derivative calculation element to the gain of the integration calculation element applied to the derivative calculation element and the integration calculation before the difference between the actual rotational speed of the runner and the desired rotational speed of the runner becomes not more than the predetermined degree.

The gain of the derivative calculation element applied to the derivative calculation element and the integration calculation when the difference between the actual rotational speed of the runner and the desired rotational speed of the runner is not more than the predetermined degree may be not less than the gain of the derivative calculation element applied to the derivative calculation element and the integration calculation when the difference between the actual rotational speed of the runner and the desired rotational speed of the runner is more than the predetermined degree, and the gain of the integration calculation element applied to the derivative calculation element and the integration calculation when the difference between the actual rotational speed of the runner and the desired rotational speed of the runner is not more than the predetermined degree may be less than the gain of the integration calculation element applied to the derivative calculation element and the integration calculation when the difference between the actual rotational speed of the runner and the desired rotational speed of the runner is more than the predetermined degree.

It is preferable for controlling the actual rotational speed of the runner stably at least when an electric power generator driven by the runner is being synchronized to be electrically connected to electric power transmission lines that a first ratio of the gain of the derivative calculation element to the gain of the integration calculation element to be applied to the derivative calculation element and the integration calculation when the difference between the actual rotational speed of the runner and the desired rotational speed of the runner is not more than the predetermined degree is greater than a second ratio of the gain of the derivative calculation element to the gain of the integration calculation element to be applied to the derivative calculation element and the integration calculation when the difference between the actual rotational speed of the runner and the desired rotational speed of the runner is more than the predetermined degree, when the electric power generator is prevented from supplying the electric power to the electric power transmission lines or before the electric power generator driven by the runner is electrically connected to the electric-power transmission lines, and a third ratio of the gain of the derivative calculation element to the gain of the integration calculation element to be applied to the derivative calculation element and the integration calculation when the electric power generator is electrically connected to the electric power transmission lines is smaller than the first ratio of the gain of the derivative calculation element to the gain of the integration calculation element.

The runner may be rotatable in either of a normal direction for being driven by the water and a reverse direction for pumping the water when the runner is prevented from being operated to drive the electric power generator.

When the turbine apparatus further comprises a proportional calculation element for generating a proportional component of the control signal whose value is proportional to the value of input signal, and the control device is a governor in accordance with the IEC International Standard 61362 First Edition, it is preferable that the gain of the derivative calculation element is more than 5 and a gain of the proportional calculation element is less than 0.5, when the difference between the actual rotational speed of the runner and the desired rotational speed of the runner is not more than the predetermined degree. In this case, it is more preferable that the gain of the proportional calculation element is more than 0.6, when the difference between the actual rotational speed of the runner and the desired rotational speed of the runner is more than the predetermined degree.

It is preferable that the flow rate of the water for driving the runner is rapidly increased just after or in response to that the electric power generator driven by the runner is electrically connected to electric power transmission lines to supply the electric power from the electric power generator to the electric power transmission lines after the actual rotational speed of the runner is synchronized in S-characteristic portion of the runner with required frequency of alternating electric current of the electric power transmission lines, from the flow rate of the water for no-load operation in which the runner is rotationally driven by the water when the electric power generator is prevented from supplying the electric power to the electric power transmission lines, so that an operating point of the runner is moved away rapidly from the S-characteristic portion.

If, under at least one of a case in which $\partial Q_1/\partial N_1 > 0$, a case in which $\partial T_1/\partial N_1 > 0$, a case in which the absolute value of $\partial Q_1/\partial N_1$ is more than the first value, and a case in which the absolute value of $\partial T_1/\partial N_1$ is more than the second value, that is, in the S-characteristic portion, a transition from increase to decrease of an opening area of the flow rate adjuster occurs with a delay in phase angle not more than 120 degrees from a transition from increase to decrease of the actual rotational speed of the runner, the decrease of the actual rotational speed of the runner is suppressed by an increase in differential pressure across the turbine caused by a change of the opening area of the flow rate adjuster and the increase of the actual rotational speed of the runner is suppressed by a decrease in differential pressure across the turbine caused by the change of the closing area of the flow rate adjuster.

If, under at least one of a case in which $\partial Q_1/\partial N_1 > 0$, a case in which $\partial T_1/\partial N_1 > 0$, a case in which an absolute value of $\partial Q_1/\partial N_1$ is more than a first value, and a case in which an absolute value of $\partial T_1/\partial N_1$ is more than the second value, that is, in the S-characteristic portion, a transition from decrease to increase of the opening area of the flow rate adjuster occurs with a delay in phase angle not more than 120 degrees from a transition from decrease to increase of the actual rotational speed of the runner, the decrease of the actual rotational speed of the runner is suppressed by the increase in differential pressure across the turbine caused by the change of the opening area of the flow rate adjuster and the increase of the actual rotational speed of the runner is suppressed by the decrease in differential pressure across the turbine caused by the change of the closing area of the flow rate adjuster.

If the ratio of the gain of the derivative calculation element to the gain of the integration calculation element applied to the derivative calculation element and the integration calculation element when the head of the water for driving rotationally the runner is not more than the predetermined value is greater than the ratio of the gain of the derivative calculation element to the gain of the integration calculation element applied to the derivative calculation element and the integration calculation element when the head of the water for driving rotationally the runner is more than the predetermined value, the derivative component of the control signal effectively suppresses the undesirable oscillation in the rotational speed of the runner when the head of the water for driving rotationally the runner is not more than the predetermined value, and the acceleration in the rotational speed of the runner from zero toward the desired rotational speed thereof is kept not too slow when the head of the water for driving rotationally the runner is more than the predetermined value.

If the ratio of the gain of the derivative calculation element to the gain of the integration calculation element applied to the derivative calculation element and the integration calculation element under at least one of a case in which $\partial Q_1/\partial N_1 > 0$, a case in which $\partial T_1/\partial N_1 > 0$, a case in which an absolute value of $\partial Q_1/\partial N_1$ is more than a first value, and a case in which an absolute value of $\partial T_1/\partial N_1$ is more than a second value is greater than a ratio of the gain of the derivative calculation element to the gain of the integration calculation element applied to the derivative calculation element and the integration calculation element under a case in which $\partial Q_1/\partial N_1 \leq 0$, $\partial T_1/\partial N_1 \leq 0$, the absolute value of $\partial Q_1/\partial N_1$ is not more than the first value, and the absolute value of $\partial T_1/\partial N_1$ is not more than the second value, the derivative component of the control signal effectively suppresses the undesirable oscillation in the rotational speed of the runner in the S-characteristic portion, and the acceleration in the rotational speed of the runner from zero toward the desired rotational speed thereof is kept not too slow in the turbine operating range other than the S-characteristic portion.

It is preferable for controlling stably the rotational speed of the turbine in the S-characteristic portion that a variation of the control signal corresponding to the opening area of the flow rate adjuster is in advance of a variation of the input signal under at least one of a case in which $\partial Q_1/\partial N_1 > 0$, a case in which $\partial T_1/\partial N_1 > 0$, a case in which an absolute value of $\partial Q_1/\partial N_1$ is more than a first value, and a case in which an absolute value of $\partial T_1/\partial N_1$ is more than a second value, that is, in the S-characteristic portion. In this situation, it is preferable that the variation of the control signal is in advance of the variation of the input signal by 30–90 degrees in phase angle of variation.

It is preferable for controlling stably the rotational speed of the turbine in the S-characteristic portion that a ratio of a gain of the derivative calculation element to a gain of the integration calculation element to be applied to the derivative calculation element and the integration calculation element when the difference between the actual rotational speed of the runner and the desired rotational speed of the runner is not more than a predetermined degree is determined in such a manner that the variation of the control signal corresponding to the opening area of the flow rate adjuster is in advance of the variation of the input signal under at least one of a case in which $\partial Q1/\partial N_1 > 0$, a case in which $\partial T_1/\partial N_1 > 0$, a case in which an absolute value of $\partial Q_1/\partial N_1$ is more than a first value, and a case in which an absolute value of $\partial T_1/\partial N_7$ is more than a second value. In this situation, it is preferable that the variation of the control signal is in advance of the variation of the input signal by 30–90 degrees in phase angle, and/or that a ratio of a gain of the derivative calculation element to a gain of the proportional calculation element to be applied to the derivative calculation element and the proportional calculation element when the difference between the actual rotational speed of the runner and the desired rotational speed of the runner is not more than the predetermined degree is determined in such a manner that the variation of the control signal is in advance of the variation of the input signal under at least one of a case in which $\partial Q_1/\partial N_1 > 0$, a case in which $\partial T_1/\partial N_1 > 0$, a case in which an absolute value of $\partial Q_1/\partial N_1$ is more than a first value, and a case in which an absolute value of $\partial T_1/\partial N_1$ is more than a second value.

Other objects, features and advantages of the invention will become apparent from the following description of the embodiments of the invention taken in conjunction with the accompanying drawings.

DETAILED DESCRIPTION OF THE INVENTION

Figure 1A:
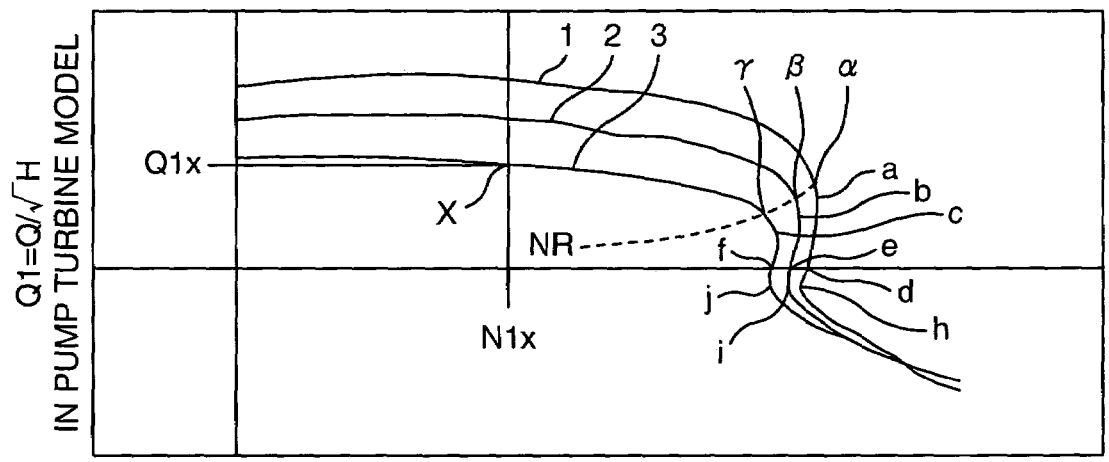
FIG. 1A is a diagram showing a relationship between unit speed (N1=N/√H) and unit discharge or unit discharge flow rate (Q1=Q/√H) on each of opening degrees of wicket gate.

Operational characteristics of a pump turbine as the claimed turbine is described below at first. A flow rate characteristic of the pump turbine is shown by a relationship between a unit speed ($N1=N/\sqrt{H}$) and a unit discharge (flow rate)($Q1=Q/\sqrt{H}$) on each of various opening degrees of a wicket gate as the claimed flow rate adjuster. A torque characteristic of the pump turbine is shown by a relationship between the unit speed ($N1=N/\sqrt{H}$) and a unit torque ($T1=T/H$) on each of various opening degrees of the wicket gate. These characteristics of the pump turbine are called as performance curves.

The flow rate characteristic includes a first area in which the unit discharge Q1 decreases in accordance with an increase of the unit speed N1 and a second area in which the unit discharge Q1 decreases in accordance with a decrease of the unit speed N1. The first area includes a slack change area in which the unit discharge Q1 changes relatively slack in accordance with a change of the unit speed N1, and an abrupt change area in which the unit discharge Q1 changes relatively abruptly in accordance with the change of the unit speed N1. In this specification, a combination of the second area and the abrupt change area is called as S-characteristic portion. Further, the torque characteristic includes a first area in which the unit torque T1 decreases in accordance with the increase of the unit speed N1 and a second area in which the unit torque T1 decreases in accordance with the decrease of the unit speed N1.

A regular operation of the pump turbine with a load in a generating mode is performed in the slack change area. The smaller an output power of the turbine under a constant value of the unit speed N1 is, that is, the smaller an opening degree or area of a wicket gate is, the smaller a distance between the S-characteristic portion and the unit speed N1 at which the regular operation of the pump turbine with the load is performed with the opening degree or area of the wicket gate is. When a rotation of the pump turbine is started, particularly when an actual-rotational speed of the turbine is increased to the vicinity of a rated rotational speed so that the rotation of the pump turbine is synchronized with a frequency of an electric power transmission line, the wicket gate is set at an opening degree or area suitable for no-load of the turbine, that is, a minimum opening degree for the regular operation, so that the distance between the S-characteristic portion and an area of the unit speed N1 at which area the regular operation of the pump turbine is performed becomes minimum. When an effective head H of a water is minimum, the unit speed N1 becomes maximum to decrease further the distance between the S-characteristic portion and the unit speed N1 at an operating point of the turbine. Therefore, when the actual rotational speed of the turbine is increased to the vicinity of the rated rotational speed so that the rotation of the pump turbine is synchronized with the frequency of the electric power transmission line, there is a probability of that the operating point enters into the S-characteristic portion to be positioned at the abrupt change area of the first area. When a variable range of the effective head H is significantly wide and a ratio of a minimum effective head H to a datum effective head H is significantly small, the probability becomes higher at the minimum effective head H. In some cases, when the actual rotational speed of the turbine is increased to the vicinity of the rated rotational speed, there is a probability of that the operating point of the turbine enters into the second area of the S-characteristic portion. Even when the variable range of the effective head H is not significantly wide, the flow rate of the water to be supplied to the turbine so that the rotation of the turbine is started needs to be increased from zero to at least a flow rate for rotation under no-load of the turbine, whereby a water hammer occurs necessarily because of the change in flow rate of the water so that there is a probability of that the operating point temporarily enters widely into the S-characteristic portion.

Figure 1B:
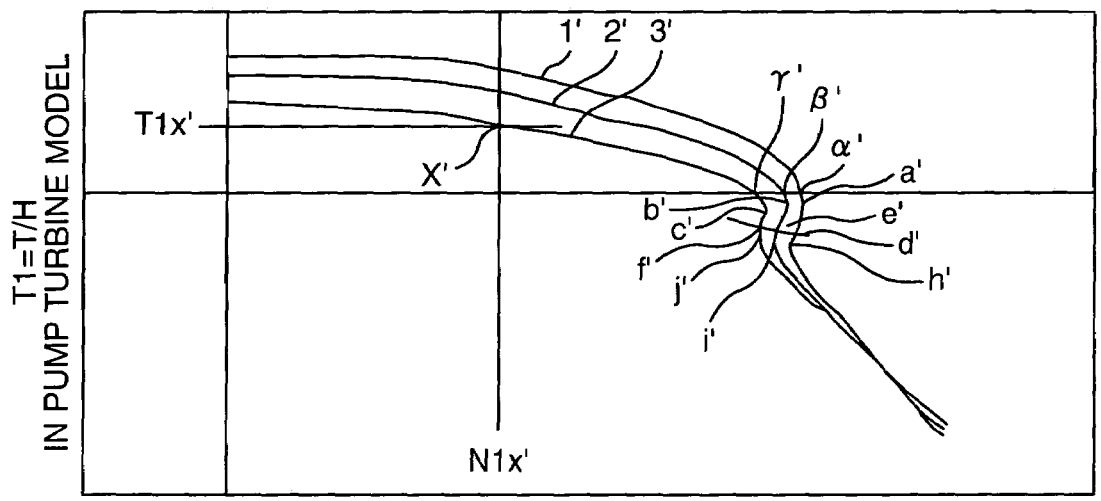
FIG. 1B is a diagram showing a relationship between unit speed (N1=N/√H) and unit torque (T1=T/H) on each of opening degrees of wicket gate.

Four quadrant performance curves of the pump turbine having the S-characteristics in turbine operating domain are shown in FIG. 1A in which a relationship between unit speed ($N1=N/\sqrt{H}$) and unit discharge ($Q1=Q/\sqrt{H}$) on each of opening degrees of wicket gate is shown and FIG. 1B in which a relationship between the unit speed ($N1=N/\sqrt{H}$) and unit torque ($T1=T/H$) on each of the opening degrees of wicket gate is shown, while N is the actual rotational speed of the turbine, Q is the flow rate of the water to be supplied to the turbine, H is the effective head H of the water, and T is the torque of the turbine.

Performance curves 1 and 1' are obtained under a relatively large predetermined opening area of the wicket gate.

Performance curves 2 and 2' are obtained under an opening area of the wicket gate smaller than the opening area of the wicket gate along the performance curves 1 and 1'. Performance curves 3 and 3' are obtained under an opening area of the wicket gate smaller than the opening area of the wicket gate along the performance curves 2 and 2'.

In the second area of the performance curve 1, that is, a-d-h curve area, the unit discharge Q1 decreases in accordance with the decrease of the unit speed N1. In the second area of the performance curve 2, that is, b-e-i curve area, the unit discharge Q1 decreases in accordance with the decrease of the unit speed N1. In the second area of the performance curve 3, that is, c-f-j curve area, the unit discharge Q1 decreases in accordance with the decrease of the unit speed N1. As clearly shown, the a-d-h curve area in the second area of the performance curve 1 is longer than the b-e-i curve area in the second area of the performance curve 2, the b-e-i curve area in the second area of the performance curve 2 is longer than the c-f-j curve area of the second area of the performance curve 3. Therefore, the smaller the opening area of the wicket gate is, the shorter a length of the S-characteristic portion in a direction of a coordinate axis of the unit discharge Q1 is.

Similarly to FIG. 1A, in FIG. 1B, the second area of the performance curve 1' is a'-d'-h' curve area, the second area of the performance curve 2' is, b'-e'-i' curve area, and the second area of the performance curve 3' is c'-f'-j' curve area.

Close relationships exist between FIGS. 1A and 1B. For example, a point x at which Q1=Q1x and N1=N1x are satisfied on the performance curve 3 in FIG. 1A corresponds to a point x' on the performance curve 3' in FIG. 1B. At the point x', T1=T1x' and N1=N1x' (=N1x) are satisfied. Similarly, the points a, b, c, d, e, f, h, i and j in FIG. 1A correspond to the points a', b', c', d', e', f', h', i' and j' in FIG. 1B.

A curve NR is a no-load discharge curve. Cross points $\alpha$, $\beta$ and $\gamma$ between the curve NR and the performance curves 1, 2 and 3 correspond respectively to cross points $\alpha'$, $\beta'$ and $\gamma'$ between the performance curves 1', 2' and 3' and the T1 coordinate axis (T1=0).

For starting the operation of the turbine in the generating mode, the rotational speed needs to be increased from zero to the rated rotational speed $N_0$ under an generator load of approximately zero, that is, the operating point is moved rightwards along the N1 coordinate axis of the N1-T1 relationship diagram from a datum point (N1=0, T1=0) obtained when being stopped to a point $N1=N_0/\sqrt{H}$. When the cross point between the N1 coordinate axis and a line of $N1=N_0/\sqrt{H}$ exists between the cross points $\alpha'$ and $\beta'$ after the actual rotational speed N increases to the rated rotational speed $N_0$, the opening area of the wicket gate needs to be increased between the performance curves 1 and 2. Further, in the N1-Q1 relationship diagram, the operating point is moved from a datum point (N1=0, Q1=0) to an intermediate point between the points $\alpha$ and $\beta$ on the curve NR. That is, the unit discharge Q1 needs to be increased from zero to the intermediate point between the points $\alpha$ and $\beta$ of Q1, and the flow rate or discharge Q needs to be increased to a corresponding amount.

When the generator connected to the turbine is a synchronous generator, a rotational speed of the turbine to be required for being put on the electric power transmission line, that is, the rated rotational speed $N_0$ is fixed, while the unit speed N1 varies in accordance with the head. When the head is of the minimum value, the actual rotational speed of the turbine needs to be synchronized with the frequency of the electric power transmission line under the maximum value of the unit speed N1. In this case, it is difficult for the operating point to be positioned in the slack change area of the first area of the flow rate characteristic or discharge performance curve, and there is a probability of that the operating point is positioned in the abrupt change area of the first area.

When a rotational direction of the runner is changeable to pump the water for the pumping mode as well as to be driven by the water for the electric power generating mode, the runner has a flat shape preferable for centrifugal pumping operation for pumping the water. Consequently, in the electric power generating mode, the S-characteristics, that is, a reverse flow appearing region caused by a centrifugal force tends to move to a N1 lower side, that is, the regular operating range of N1. Therefore, in the turbine for pumping the water as well as generating the electric power, when a pumping performance is improved, it tends to be difficult for the rotational speed of the turbine to be controlled stably during rotational start of the turbine in the electric power generating mode.

In this case, there is a probability of that the actual rotational speed of the turbine cannot be kept stable sufficiently for putting the electric power generator on the electric power transmission line, after the actual rotational speed of the turbine increases to the vicinity of the rated rotational speed of the turbine. Especially, when the operating point of the turbine is positioned in the second area as the S-characteristic portion during synchronizing the actual rotational speed of the turbine with the frequency of the electric power transmission line before putting the electric power generator on the electric power transmission line, the rotational speed of the turbine cannot be adjusted in the prior art desirably for putting the electric power generator on the electric power transmission line, and an electric power generating plant including such turbine is not usable in such a value of the head.

Figure 2:
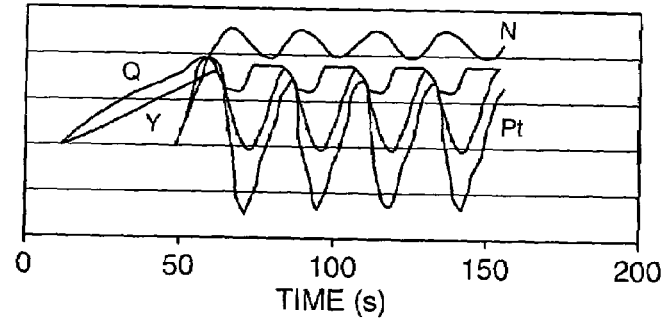
FIG. 2 includes diagrams showing relationships among time (s), opening degree of wicket gate (Y), water (discharge) flow rate for turbine (Q), turbine output power ($P_t$) and trajectory of operation point of turbine on unit discharge Q1 versus unit speed N1 plane in a dynamic simulation analysis of prior art.
Figure 2:
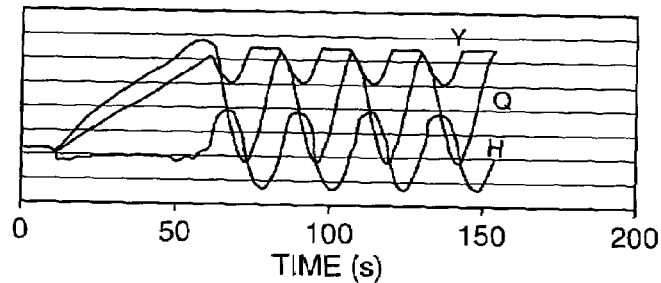
Figure 2:
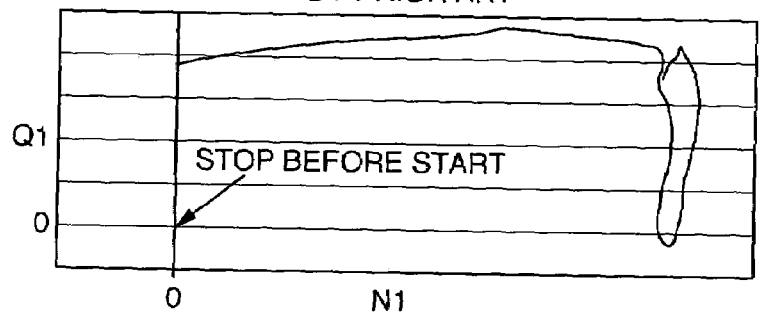
Figure 2:
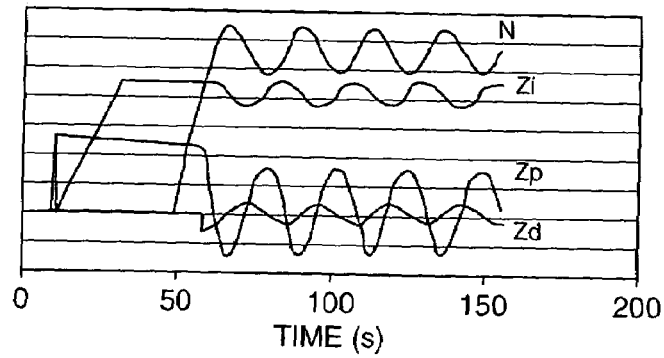

In FIG. 2 showing analyzing or simulating results of the turbine rotational speed synchronizing control by the prior art in a case in which the operating point of the turbine is positioned in the second area as the S-characteristic portion, a diagram (A) shows a relationship between a time proceeding and each of an opening degree or area Y of the wicket gate, the flow rate Q supplied to the turbine, the actual rotational speed N of the turbine and an output power Pt of the turbine, a diagram (B) shows a relationship between a time proceeding and each of an opening degree or area Y of the wicket gate, the flow rate Q of the water applied to the turbine, and an effective head H of the water applied to the turbine, a diagram (C) shows a trajectory of the operating point of the turbine on N1-Q1 plane, and a diagram (d) shows a relationship between a time proceeding and each of an output signal Zp of a proportional calculation element, an output signal Zi of an integration calculation element and an output signal Zd of a derivative calculation element in a PID calculation device receiving an input signal corresponding to a difference between the actual rotational speed of the runner and a desired rotational speed of the runner and generating an output signal corresponding to a command signal for the opening degree or area Y of the wicket gate.

Figure 12:
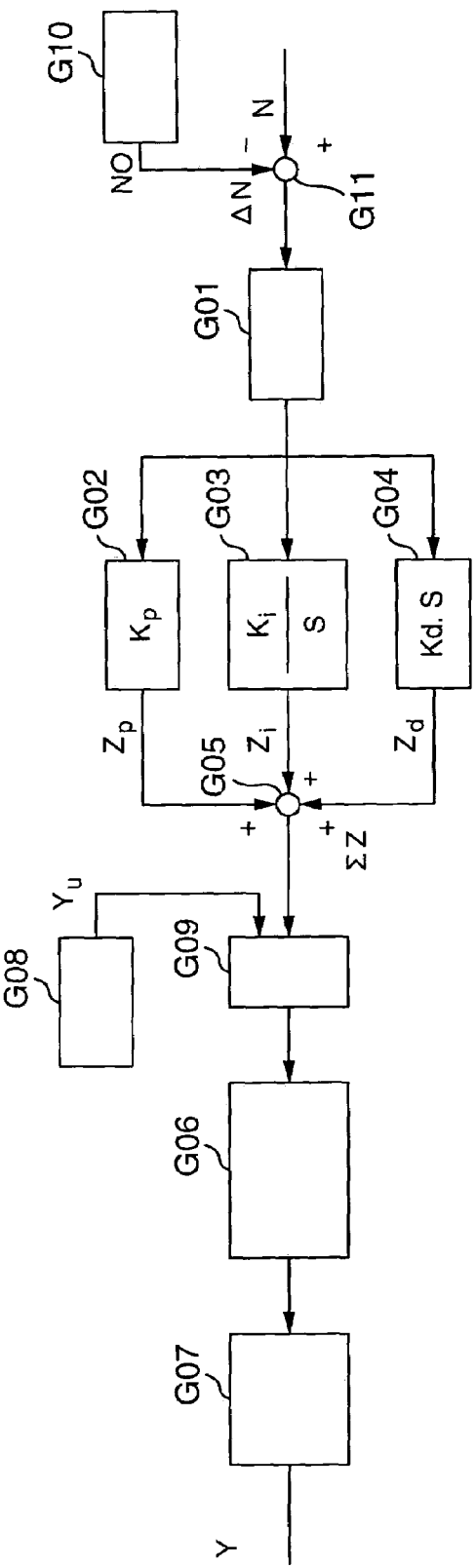
FIG. 12 is a block diagram of a governor.

A governor for controlling the actual rotational speed of the runner as shown in FIG. 12, includes a target speed setter G10 for setting a target rotational speed of the turbine, a comparator G11 for calculating a difference between the target rotational speed of the turbine and the actual rotational speed of the turbine, a positive-negative sign changer G01, a proportional calculation element G02, an integration calculation element G03, a derivative calculation element G04, an adder G05, a hydraulic amplifier or servo-motor G06 for driving the wicket gate and a link mechanism G07 for converting mechanically an output movement of the hydraulic amplifier or servo-motor G06 to a movement of the wicket gate for adjusting the flow rate of the water. An LVG (low value gate) G09 outputs lower one of an wicket gate opening degree limit signal generated by a wicket gate opening degree limiter G08 for limiting a maximum value Yu of an wicket gate opening degree or area and a total amount of the output signals Zp, Zi and Zd, so that the output signal corresponding to the wicket gate opening degree or area is prevented from having an excessive value. Before starting the rotation of the turbine, the target rotational speed is set in the vicinity of the rated rotational speed, and the maximum value Yu of the wicket gate opening degree or area is set in such a manner that the flow rate of the water determined by the wicket gate opening degree or area is sufficient for accelerating rotationally the turbine from zero of the rotational speed and for preventing an excessive overshoot of the actual rotational speed of the turbine in comparison with the target rotational speed. As shown in the diagram of FIG. 2, when the maximum value Yu of the wicket gate opening degree or area set by the wicket gate opening degree limiter G08 is increased from zero, the wicket gate opening degree increases gradually to increase the flow rate of the water applied to the turbine. In response to that a torque generated on the turbine by the water exceeds a static friction torque of the turbine, an increase of the actual rotational speed of the turbine starts from zero.

By setting a gain of the derivative calculation element G04 appropriately as the present invention, unstable changes of the opening degree or area Y of the wicket gate, the flow rate Q supplied to the turbine, the actual rotational speed N of the turbine and the output power Pt of the turbine as shown in FIG. 2 are restrained. That is, by the present invention, the actual rotational speed N of the turbine is stably controlled even when the operating point of the turbine is positioned in the second area as the S-characteristic portion during an increase of the actual rotational speed of the runner from zero toward the target rotational speed of the runner, so that a range of the head in which the actual rotational speed N of the turbine is stably controlled is enlarged to a lower level the head.

A typical model of a turbine rotational speed control system to which the present invention is applicable is shown as follows. Incidentally, a water path or column extending to the turbine from each of upstream and downstream sides thereof is considered as a rigid column in accordance with the rigid column theory. Basis formulas are as follows.

In these formulas, Q is the flow rate (m²/s) of the water applied to the turbine, $Q_0$ is an initial value of the flow rate, Y is the opening degree (pu) of the wicket gate, $Y_0$ is an initial value of the opening degree of the wicket gate, N is the actual rotational speed (rpm) of the turbine, $N_0$ is an initial value (rpm) of the actual rotational speed of the turbine, H is the effective head (m) of the water applied to the turbine, $H_0$ is an initial value (m) of the effective head, $\Psi$ is a turbine efficiency (pu), $\Psi_0$ is an initial value of the turbine efficiency, L is a total length (m) of water columns extending to the turbine from upstream and downstream sides thereof, A is an averaged value (m²) of cross sectional areas of the water columns extending to the turbine from upstream and downstream sides thereof, g is the gravitational constant (m/s²), t is proceeding time (s), Pt is an output power (KW) of the turbine, $Pt_0$ is an initial value of the output power of the turbine, and a rotational moment of inertia of a combination of the electric power generator and the turbine (kgf*m²): I is (GD²/4 g) while the initial values are measurable at the proceeding time of zero.

These parameters are made dimensionless respectively by a wicket gate opening degree Yr under the rated output power of the turbine and the rated head, a rated turbine rotational speed Nr, the rated head Hr, the rated flow rate Qr under the rated output power of the turbine and the rated head, the rated output power Ptr of the turbine, and the rated turbine efficiency $\Psi r$ under the rated output power and the rated head, so that y=$\Delta$Y/Yr, n=$\Delta$N/Nr, h=$\Delta$H/Hr, q=$\Delta$Q/Qr, pt=$\Delta$Pt/Ptr and $\eta$=$\Delta\Psi$/$\Psi$r are obtained.

Figure 3:
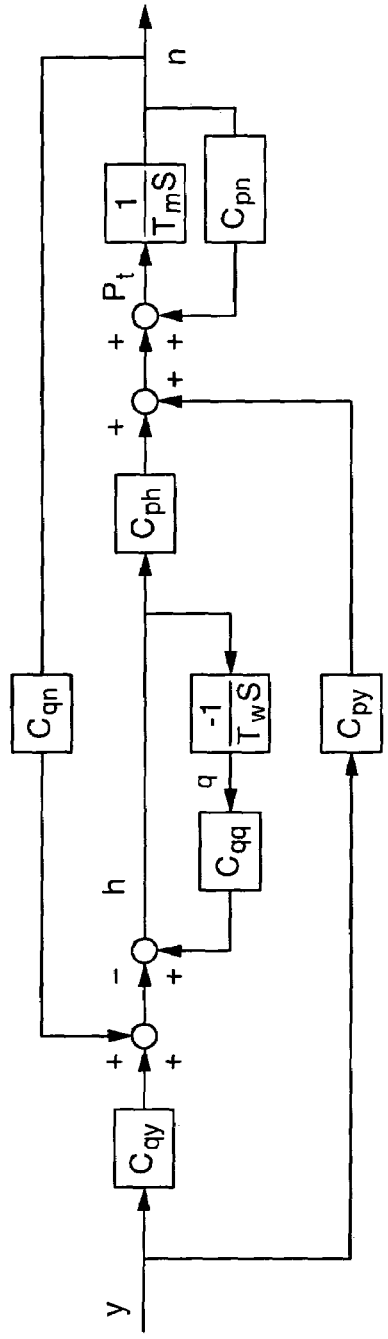
FIG. 3 is a block diagram showing a linearized simulation model of a turbine as a controlled object and a generator.
Figure 4:
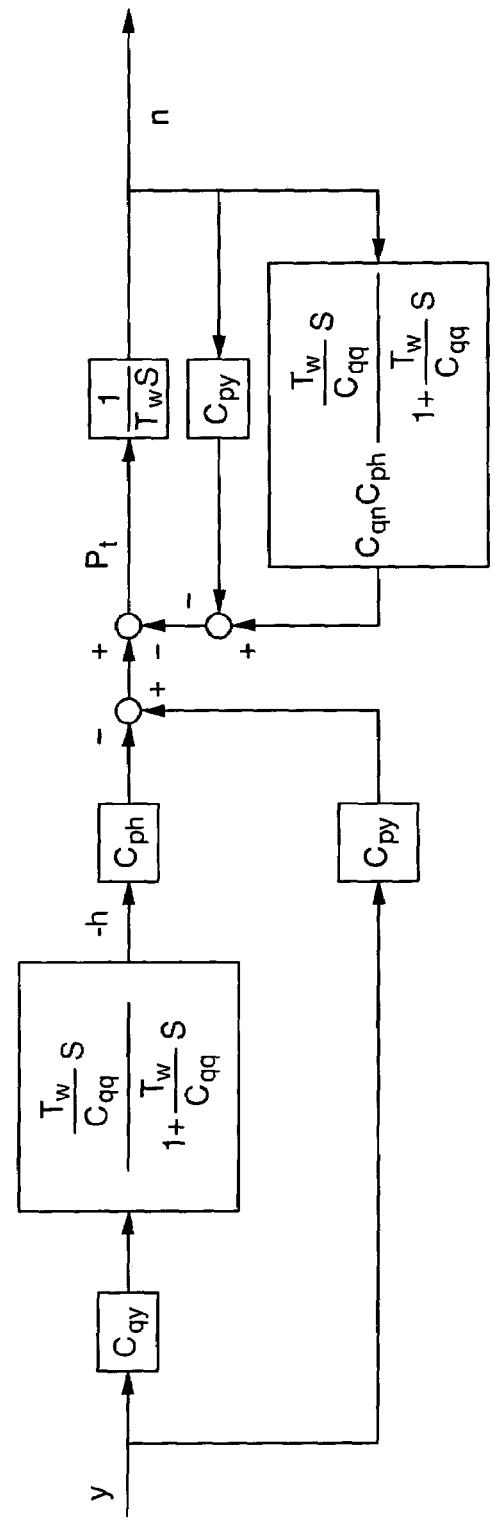
FIG. 4 is a block diagram showing a linearized simulation model of a turbine as a controlled object and a generator.

By setting that $\eta_0$=$\Psi_0$/$\Psi r$, $q_0$=$Q_0$/Qr, $pt_0$=$Pt_0$/Ptr, $h_0$=$H_0$/Hr, $y_0$=$Y_0$/Yr, and $n_0$=$N_0$/Nr, and by deeming changes of the parameters in the vicinities of the respective initial values to be negligible, the typical model of the turbine rotational speed control system to which the present invention is applicable may be expressed in linearized models as shown in FIGS. 3 and 4. Incidentally, y is the opening degree of the wicket gate (p.u.) and pt is the output power of the turbine (p.u.), and n is the actual rotational speed of the turbine (p.u.). Tm is a time constant (sec) of an inertia effect of the combination of the generator and the turbine corresponding to (NrN₀GD²)/(365000Ptr), and Tw is a time constant (sec) of the water columns extending to the turbine from upstream and downstream sides thereof, which time constant corresponds to (LQr)/(AHrg). S is Laplace operator, and coefficients Cph, Cpy, Cpn, Cqq, Cqy and Cqn are defined as follows.

$$Q = Q_0 + \Delta Q = Q_0 + \frac{\partial Q}{\partial Y}\Delta Y + \frac{\partial Q}{\partial N}\Delta N + \frac{\partial Q}{\partial H}\Delta H$$

$$\Psi = \Psi_0 + \Delta\Psi = \Psi_0 + \frac{\partial \Psi}{\partial Y}\Delta Y + \frac{\partial \Psi}{\partial N}\Delta N + \frac{\partial \Psi}{\partial H}\Delta H$$

$$\Delta H = -\frac{L}{Ag}\frac{dQ}{dt}$$

$$P_t = P_{t0} + \Delta P_t = 9.8\Psi QH$$

$$\frac{dN}{dt} = \frac{60^2 \times 4 \times 102 g\Delta P_t}{4\pi^2 N_0 GD^2} = \frac{365000\Delta P_t}{N_0 GD^2}$$

$$C_{ph} = \eta_0 q_0 + \frac{\partial Q}{\partial H}\frac{H_0}{Q_r}\eta_0 + \frac{\partial \Psi}{\partial H}\frac{H_0}{\Psi_r}q_0$$

$$C_{py} = \left(\frac{\partial Q}{\partial Y}\frac{\eta_0}{Q_r} + \frac{\partial \Psi}{\partial Y}\frac{q_0}{\Psi_r}\right)h_0 Y_r$$

$$C_{pn} = \left(\frac{\partial Q}{\partial N}\frac{\eta_0}{Q_r} + \frac{\partial \Psi}{\partial N}\frac{q_0}{\Psi_r}\right)h_0 N_r$$

$$C_{qq} = \frac{Q_r}{\frac{\partial Q}{\partial H}H_r}$$

$$C_{qy} = \frac{\frac{\partial Q}{\partial Y}Y_r}{\frac{\partial Q}{\partial H}H_r}$$

-continued $$C_{qn} = \frac{\frac{\partial Q}{\partial N} N_r}{\frac{\partial Q}{\partial H} H_r}$$

Figure 5:
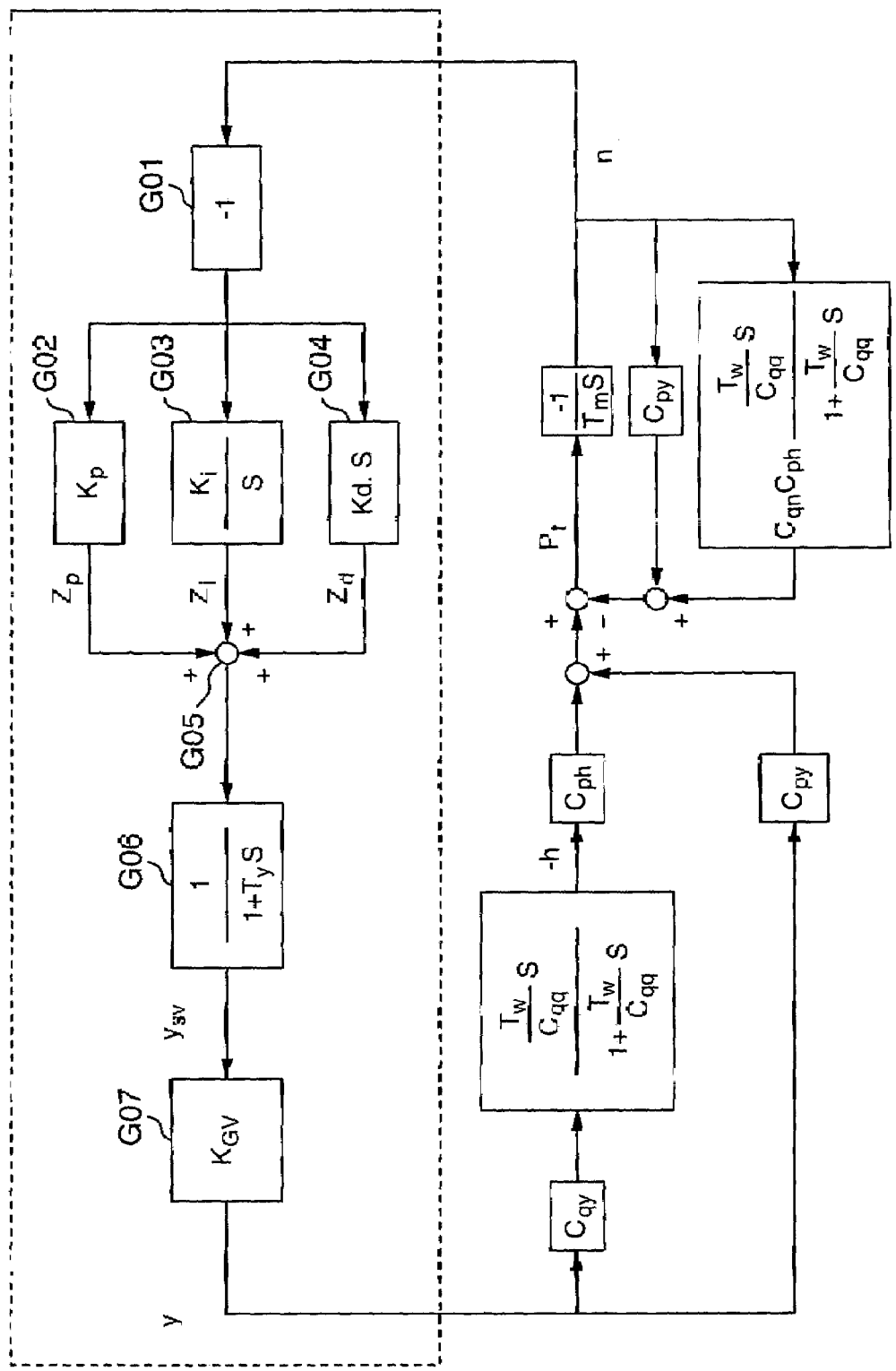
FIG. 5 is a block diagram showing a linearized simulation model of a rotational speed control system including the controlled object.

FIG. 5 shows a typical model of a turbine rotational speed control system which includes a linearized model of a turbine as a controlled system as shown in FIGS. 3 and 4 and a linearized PID type governor or control device as enclosed by dot-line in FIG. 5, and to which the present invention is applicable. The turbine rotational speed control system includes the positive-negative sign changer G01, the proportional calculation element G02, the integration calculation element G03, the derivative calculation element G04, the adder G05, the hydraulic amplifier or servo-motor G06 for driving the wicket gate and the link mechanism G07 for converting mechanically the output movement of the hydraulic amplifier or servo-motor G06 to the movement of the wicket gate for adjusting the flow rate of the water. Kp is a gain of the proportional calculation element G02, Ki is a gain of the integration calculation element G03, Kd is a gain of the derivative calculation element G04, Ty is a time constant of the hydraulic amplifier or servo-motor G06, and $K_{GV}=y/y_{SV}$.

A basic concept of the invention is explained below. A rotational speed control of the turbine according to the invention is not performed by using a stationary control factor Cpy, but is performed by using a transient control factor or a water hammer factor which is generated along Cqy having positive value in the S-characteristic portion in which $\partial_1/\partial N_1 >0$ and/or $\partial T_1/\partial N_1 >0$ and Cqh having negative value in the S-characteristic portion in which $\partial Q_1/\partial_1 >0$ and/or $\partial T_1/\partial N_1 >0$ in a control loop y→-h→p_t→n→governor→y. By making the gain Kd of the derivative calculation element significantly greater than the gains of the other calculation elements, the transient power effect by the water hammer factor -Cqy. Cqh can be made significant in the S-characteristic portion in which $\partial Q_1/\partial N_1 >0$ and/or $\partial T_1/\partial N_1 >0$ as compared with the stationary power effect by the stationary power factor Cpy based on the stationary wicket gate opening versus turbine output power relation. Besides, by making the gain Kd of the derivative calculation element significantly greater than the gains of the other calculation elements, the transient power factor by the water hammer -Cqy. Cqh can be made to work timely for the speed control, since the phase shift of the speed control signal through the governor becomes nearly 90 degree in advance phase and accordingly the resultant power can be made to change nearly in phase with the input signal to the governor PID circuits. For example, when the rotational speed n decreases in the second area as the S-characteristic portion, the opening degree y of the wicket gate is increased to decrease the flow rate of the water in the S-characteristic portion so that the water hammer is generated timely to increase a pressure difference across the turbine. By increasing the pressure difference across the turbine, the turbine output is increased timely and the decrease of the rotational speed n of the turbine is prevented or restrained so that the rotational speed n is controlled stably.

When the head H is in the vicinity of the rated head or the rotational speed of the turbine is relatively low during increase of the actual rotational speed of the turbine from zero toward the desired rotational speed, N1 (=N/√H) does not become significantly high and the operating point of the turbine is not positioned in the second area as the S-characteristic portion. In other words, when the head H is in the vicinity of its minimum value or the rotational speed of the turbine is in the vicinity of the rated rotational speed, there is a probability of that the operating point of the turbine is positioned in the second area as the S-characteristic portion. Therefore, the gain Kd of the derivative calculation element should be made significantly greater than the gains of the other calculation elements when the head H is in the vicinity of its minimum value or the rotational speed of the turbine is in the vicinity of the rated rotational speed. If the gain Kd of the derivative calculation element is made significantly greater than the gains of the other calculation elements also in case of that the head H is not in the vicinity of its minimum value or the rotational speed of the turbine is not in the vicinity of the rated rotational speed, that is, in case of that the operating point of the turbine is positioned in the first area of the S-characteristic or an area other than the S-characteristic portion, there is a probability that the rotational speed control by the governor becomes too sluggish because the gain Ki of the integration calculation element and the gain Kp of the proportional calculation element can not be set sufficiently high even if there is no such need. Therefore, it is preferable that the gain Kd of the derivative calculation element is made significantly greater than the gains of the other calculation elements when the head H is in the vicinity of its minimum value or the rotational speed of the turbine is in the vicinity of the rated rotational speed, and the the gain Kd of the derivative calculation element is prevented from being made significantly greater than the gains of the other calculation elements when the head H is not in the vicinity of its minimum value or the rotational speed of the turbine is not in the vicinity of the rated rotational speed.

Figure 6:
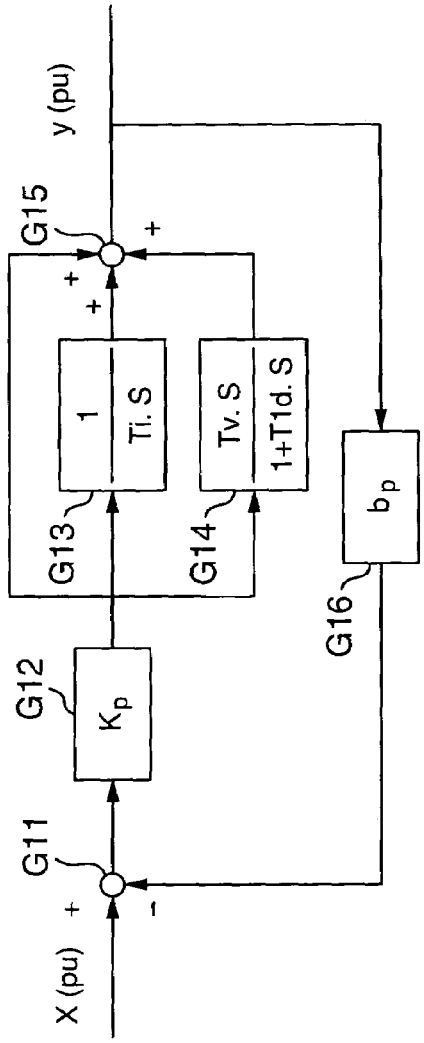
FIG. 6 is a block diagram of a governor for a turbine in accordance with the latest International Standard version.

A PID type speed governor for the turbine in accordance with the latest IEC International Standard 61362 (Guide to Specification of Hydraulic Turbine Control Systems) First Edition is formed as shown in FIG. 6, and includes an adder G11, a proportional calculation element G12, an integration calculation element G13, a derivative calculation element G14, an adder G15, and a speed droop circuit G16 as a feed back circuit for obtaining y proportional to x. A value of x in the IEC International Standard corresponds to n in FIG. 5. A speed droop bp is neglected in FIG. 5, because it does not have significant effect on the transient phenomenon of the governor. The gain Kp of the governor in FIG. 6 is the same as the gain Kp of the governor in FIG. 5, the gain Ki of the governor in FIG. 5 corresponds to Ki (=Kp/Ti) of the governor in FIG. 6, and the gain Kd of the governor in FIG. 5 corresponds to Kd (=KpTv) of the governor in FIG. 6. $T_1d$ in FIG. 6 is neglected in FIG. 5, because of a significantly small value thereof. A time constant Ty of a hydraulic amplifier in FIG. 5 is neglected in FIG. 6. During increase of the actual rotational speed of the turbine from zero toward the rated rotational speed of the turbine, in response to that the actual rotational speed increases to the vicinity of the rated rotational speed, the gain Ki of the integration calculation element is significantly decreased and the gain Kd (=KpTv) of the derivative calculation element is increased or kept constant so that a derivative calculation emphasizing setting of the governor is brought about. Further, the gain Kp of the proportional calculation element may be decreased with the decrease of the gain Ki of the integration calculation element to more effectively bring about the derivative calculation emphasizing setting.

After the actual rotational speed of the runner is synchronized with required frequency of alternating electric current of electric power transmission lines, and subsequently the electric power generator is electrically connected to the electric power transmission lines to supply the electric power from the electric power generator to the electric power transmission lines, it is preferable that the opening degree of the wicket gate is rapidly increased to a degree more than a predetermined degree to move the operating point of the turbine away from the S-characteristic portion in such a manner that a sudden output power drop of the generator causing a withdrawal of electric power from the power transmission line into the generator is prevented from occurring in the S-characteristic portion. If more than 2–3 seconds elapses without the rapid increase of the opening degree of the wicket gate after the actual rotational speed of the runner is synchronized with required frequency of alternating electric current of electric power transmission lines, and subsequently the electric power generator is electrically connected to the electric power transmission lines, there is a probability of that a torque for keeping the rotational speed of the turbine and the generator constant decreases rapidly and the output power of the generator becomes less than zero to withdraw the electric power from the power transmission line into the generator, that is, to pump the water although the generator must generate the electric power. Therefore, both a rapid start of increasing the opening degree of the wicket gate and an increase of the opening degree of the wicket gate more as fast as possible are necessary so that the operating point is moved rapidly away from the S-characteristic portion.

In the latest IEC International Standard for the governor, an adjustable range of the gain Kp of the proportional calculation element is 0.6–10. According to the present invention for the speed control of the turbine in the S-characteristics, the gain Kp of the proportional calculation element is significantly decreased from the adjustable range of the latest IEC International Standard to bring about the derivative calculation emphasizing setting. Although an adjustable range of the gain Tv of the derivative calculation element is 0–2 in the latest IEC International Standard and subsequently an adjustable range of the derivative gain Kd (=KpTv) is 0–1.2 even when the gain Kp of the proportional calculation element is set at 0.6 of the minimum value, the derivative gain Kd (=KpTv) for the derivative calculation emphasizing setting needs to be not less than 5 in the present invention.

During performing the derivative calculation emphasizing setting, a control signal corresponding to the opening degree or area of the wicket gate is mainly changed by the derivative calculation element while the integration calculation element maintains its output almost constant and without participating in the speed control when a periodic variation of the speed signal to the governor is relatively short cycle not more than 50 seconds. And, only when the variation of the input signal has a relatively long cycle, the integration calculation element participates in the speed control. Since the derivative calculation element generates a derivative component of the control signal having a progress of 90 degrees in phase from a variation wave of an input signal -N, and the integration calculation element generates an integral component of the control signal having a delay of 90 degrees in phase from the variation wave of the input signal -N, a ratio of the gain of the integration calculation element to the gain of the derivative calculation element needs to be significantly small to prevent a value of the control signal from being affected significantly by an integral component of the control signal generated by the integration calculation element during the performing the derivative calculation emphasizing setting. Therefore, a variation wave of the control signal has a progress of 90 degrees in phase from the variation wave of the input signal -N and a delay of 90 degrees in phase from the variation wave of the input signal N. Since the hydraulic amplifier or servo-motor for moving the wicket gate has a delay of its output movement, a variation wave of the movement or opening degree of the wicket gate has a delay slightly greater than 90 degrees from the input signal N.

Since the wicket gate opening to water hammer to turbine output routine through the coefficients Cqy and Cph accompanies about 90 degree phase delay in total including sign reversal or 180 degree phase shift at the flow rate to water hammer conversion portion as obvious from FIG. 5, it is preferable that the phase advancing shift through the governor including the hydraulic amplifier is adjusted to be not less than 30 degree so that the overall phase delay from the governor input signal to the turbine output change can be made 60 degree or smaller.

Figure 13:
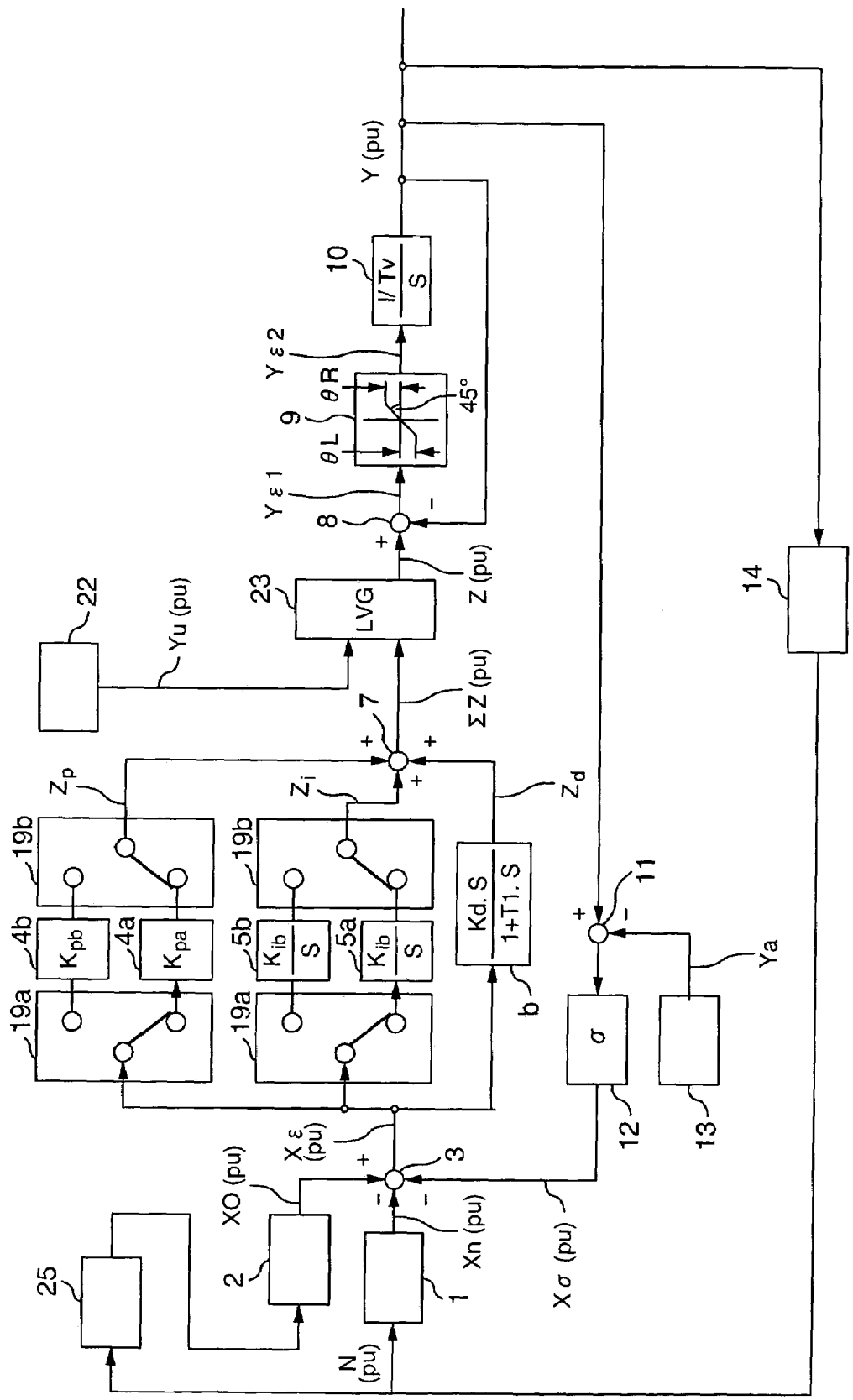
FIG. 13 is a block diagram of a pump turbine apparatus with a governor of the invention.

A turbine apparatus as shown in FIG. 13, includes a speed sensor 1 for generating a turbine speed signal Xn corresponding to the actual rotational speed N of the turbine as the claimed turbine, a speed setter 2 for generating a target speed signal Xo corresponding to the desired or target rotational speed of the turbine, and an adder 3 for generating a deviation signal Xε corresponding to a total amount of a difference between the turbine speed signal Xn and the target speed signal Xo (corresponding to the difference between the actual rotational speed N and the desired or target rotational speed) and a feed back signal Xσ generated by a speed droop circuit, so that the deviation signal Xε is input to PDI calculation device.

When the actual rotational speed N increases from zero to a predetermined value, a proportional calculation element 4a of relatively high gain Kpa is used in the PDI calculation device. When the actual rotational speed N exceeds the predetermined value, a proportional calculation element 4b of relatively low gain Kpb (<<Kpa) is used in the PDI calculation device. Switching between the proportional calculation elements 4a and 4b is performed by pairs of contacts 19a and 19b. For example, Kpa is 2.3 and Kpb is 0.1. When the actual rotational speed N increases from zero to the predetermined value, an integration calculation element 5a of relatively high gain Kia is used in the PDI calculation device. When the actual rotational speed N exceeds the predetermined value, the integration calculation element 5b of relatively low gain Kib (<<Kia) is used in the PDI calculation device. Switching between the integration calculation elements 5a and 5b is performed by the pairs of contacts 19a and 19b. For example, Kia is 0.2 and Kib is 0.02. Each pair of contacts 19a and 19b is applied to respective one of a pair of the proportional calculation elements 4a and 4b and a pair of the integration calculation elements 5a and 5b so that both the switching between the proportional calculation elements 4a and 4b and the switching between the integration calculation elements 5a and 5b are simultaneously brought about.

A derivative calculation element 6 has a fixed significantly high gain Kd, for example, 12 so that the derivative calculation emphasizing setting is performed when the actual rotational speed N exceeds the predetermined value.

A signal Zp from the proportional calculation element 4a or 4b, a signal Zi from the integration calculation element 5a or 5b and a signal Zd from the derivative calculation element 6 are added to each other by an adder 7 to generate a signal ΣZ. A low value gate 23 generates a control signal Z corresponding to smaller one of the signal ΣZ and a wicket gate maximum opening degree limiting signal Yu set by a wicket gate maximum opening degree or load limiter 22, so that an output signal from the low value gate 23 is prevented from exceeding the wicket gate maximum opening degree limiting signal Yu. Incidentally, when the wicket gate maximum opening degree limiting signal Yu is smaller than the signal ΣZ, the signal Zi from the integration calculation element 5a or 5b being used is prevented from having an excessive value. Incidentally, the control signal Z corresponds to an ordered or target opening degree or area of the wicket gate. A signal Y corresponds to an actual value of the opening degree or area of the wicket gate.

A hydraulic amplifier device includes an adder 8, a limiter 9 and a hydraulic servo mechanism or motor 10 for moving the wicket gate, so that a first order lag function with wicket gate traveling speed limiter is formed, and the wicket gate is moved in such a manner that a difference (corresponding to a signal Yϵ1) between the ordered or target opening degree or area of the wicket gate corresponding to the control signal Z and the actual value of the opening degree or area of the wicket gate corresponding to the signal Y is decreased or minimized. The limiter 9 receiving the signal Yϵ1 limits opening speed of the wicket gates to θR/Ty and closing speed of the wicket gates to θL/Ty. The signal Yϵ1 corresponds to a displacement of a distributing valve without a displacement limiter and the signal Yϵ2 corresponds to a displacement of the distributing valve with the displacement limiter.

In an adder 11, the signal Y corresponding to the actual value of the opening degree or area of the wicket gate and a wicket gate opening degree setting signal Ya generated by an output adjuster 13 and corresponding to a desired output power are added to each other. During the increase of the actual rotational speed of the turbine from zero toward the target actual rotational speed of the turbine, the wicket gate opening degree setting signal Ya has a value corresponding to an opening degree of the wicket gate suitable for no-load rotation of the turbine. When the opening degree of the wicket gate set for no-load operation of the turbine is greater than the actual value of the opening degree or area of the wicket gate, an opening signal of σ (Ya-Y) is continuously input into the PID calculation device so that a difference between the opening degree of the wicket gate set for no-load rotation of the turbine and the actual value of the opening degree or area of the wicket gate becomes zero. The coefficient σ is set by a speed droop circuit 12. in other words, the coefficient σ is a gain between the turbine speed signal Xn corresponding to the actual rotational speed N of the turbine and the signal Y corresponding to the actual value of the opening degree or area of the wicket gate, and usually have a fixed value determined on the basis of role of the electric generation plant, that is, a load bearing ratio of the electric generation plant in the electric power transmission system. A block 14 shows a combination of the turbine which is driven by the water adjusted by the wicket gate and the electric generator driven by the turbine.

Figure 14:
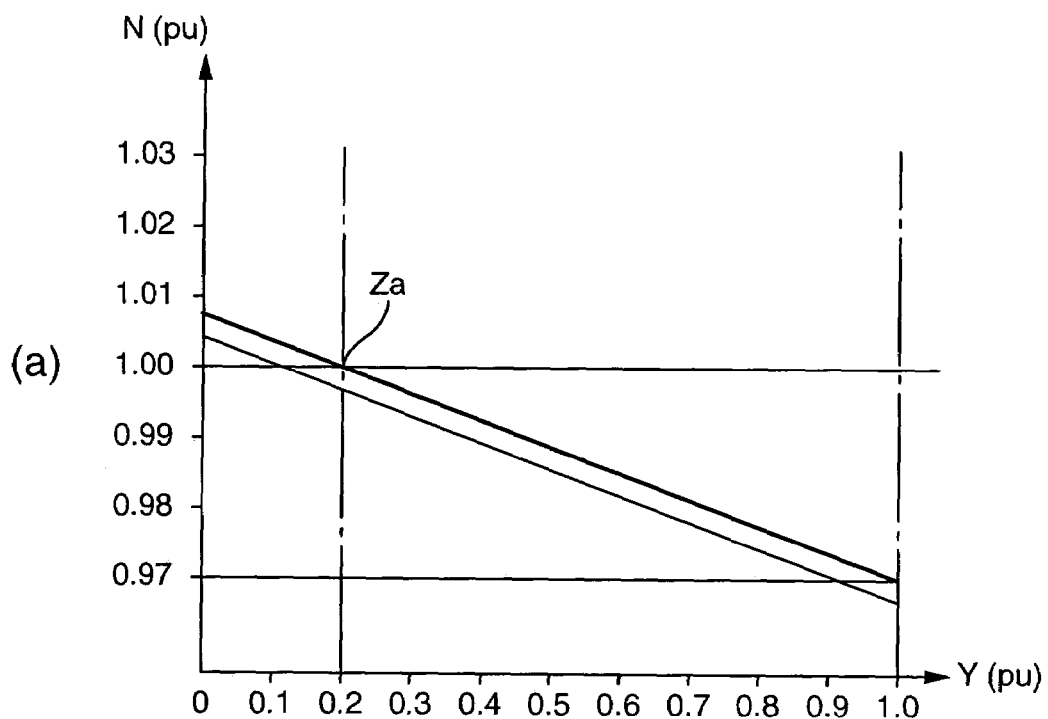
FIG. 14 (sections (a) and (b)) are diagrams showing relationships between opening degree of wicket gate (y) and rotational speed of runner (N) as result of operations of speed adjuster, output adjuster and speed droop circuit of governor.
Figure 14:
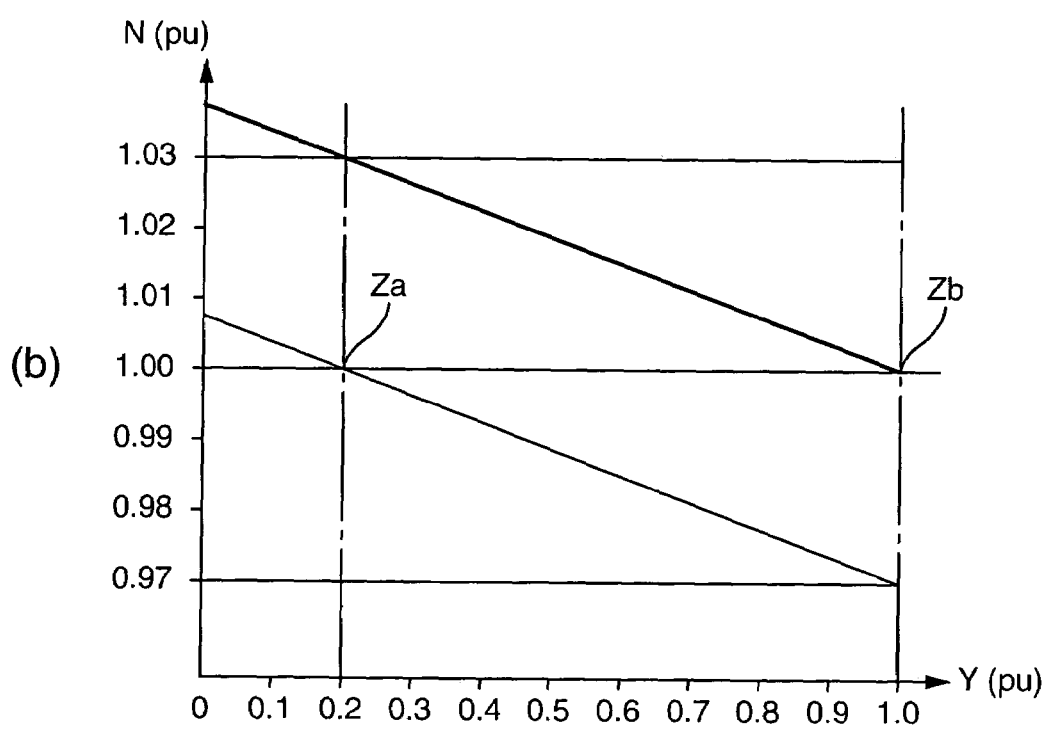
Figure 15:
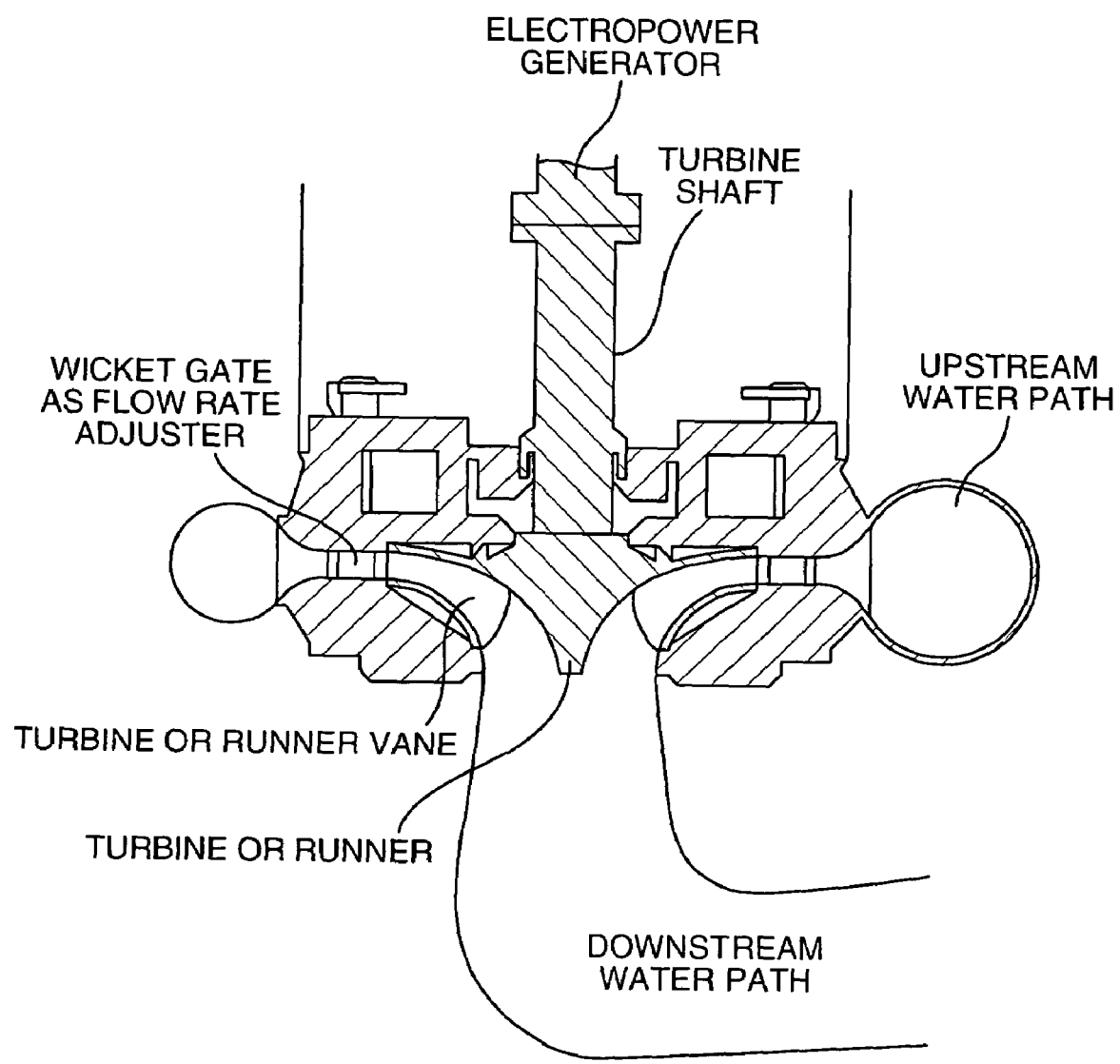
FIG. 15 is a schematic view showing a turbine apparatus usable in the invention.

Operations of the speed setter 2, output adjuster 13 and speed droop circuit 12 are explained with reference to diagram (a) in FIG. 14 which corresponds to the operations just before the generator is electrically connected to the power transmission line to supply the electric power from the generator to the power transmission line and diagram (b) in FIG. 14 which corresponds to the operations after the generator is electrically connected to the power transmission line to supply the electric power from the generator to the power transmission line. In diagram (a) in FIG. 14, a solid line descending from left to right indicates a relationship between the signal Y corresponding to the actual value of the opening degree or area of the wicket gate and the actual rotational speed of the turbine to be applied to the derivative calculation element and the integration calculation element when the turbine rotates at the desired or target rotational speed (N (pu) is 1.00) with the wicket gate opening degree 0.2 (pu) and no turbine load. When the rotation of the turbine is started, a line indicating the relationship between the signal Y corresponding to the actual value of the opening degree or area of the wicket gate and the actual rotational speed of the turbine is positioned below the solid line by the speed setter 2, as shown in a dot line. If the wicket gate opening degree is fixed to 0.2 (pu) as shown in diagram (a) in FIG. 14 when the turbine is rotated with no turbine load, the rotational speed of the turbine is changed by the speed setter 2. In diagram (b) in FIG. 14, a solid line descending from left to right indicates a relationship between the signal Y corresponding to the actual value of the opening degree or area of the wicket gate and the actual rotational speed of the turbine to be applied to the derivative calculation element and the integration calculation element when the turbine rotates at the desired or target rotational speed (N (pu) is 1.00) with the actual value of the opening degree or area of the wicket gate of 1.0 (pu) corresponding to the signal Y, that is, 100% or full turbine load or output. Just after the generator is electrically connected to the power transmission line to supply the electric power from the generator to the power transmission line, that is, when the turbine rotates with extremely small load or output power, as shown in diagram (b) in FIG. 14, a line indicating the relationship between the signal Y corresponding to the actual value of the opening degree or area of the wicket gate and the actual rotational speed of the turbine is positioned below the solid line, as shown in a dot line. After the generator is electrically connected to the power transmission line to supply the electric power from the generator to the power transmission line, the turbine with the load or output power should rotate correctly at the desired or target rotational speed (N (pu) is 1.00), whereby the line indicating the relationship between the signal Y corresponding to the actual value of the opening degree or area of the wicket gate and the actual rotational speed of the turbine is moved along a line of N=1.00 horizontally by the output adjuster 13 between the solid line. and the dot line in diagram (b) in FIG. 14. When the frequency of the electric power transmission line increases from N=1.00 to N=1.03 while the turbine operates along the solid line for N=1.00 and Y=1.0 in diagram (b) in FIG. 14, the actual value of the opening degree or area of the Swicket gate decreases Y=1.0 to Y=0.2. When the frequencyof the electric power transmission line increases from N=1.00 to N=1.015 while the turbine operates along the solid line for N=1.00 and Y=1.0 in diagram (b) in FIG. 14, the actual value of the opening degree or area of the wicket gate decreases Y=1.0 to Y=0.6. A proportional rate between a change of the frequency of the electric power transmission or a required or target rotational speed of the turbine and a change of the actual value of the opening degree or area of the wicket gate is adjusted by the speed droop circuit 12. By increasing the gain of the speed droop circuit 12, an inclination degree of the solid line descending from left to right is increased, and a gain of a change of the actual value of the opening degree or area of the wicket gate with respect to the change of the frequency of the electric power transmission or the required or target rotational speed of the turbine is decreased.

Incidentally, the operating point of the turbine 14 in FIG. 13 having N1=0 and Q1=0 obtained before the turbine rotation start moves into the S-characteristic portion of reverse flow appearing region in which $\partial Q_1/\partial N_1 > 0$, under an extremely low head of the water for driving the turbine. In this case, the water starting time Tw of the water columns for the turbine is 2.87 (s) and the mechanical starting time Tm of a rotary inertia of the generator and the turbine is 16.2 (s).

The operation of the turbine apparatus as shown in FIG. 13 from the turbine rotation start to the synchronization of the actual turbine rotation with the desired rotation turbine rotation is simulated by a computer as shown in FIGS. 7–12. A difference in condition between the turbine rotational speed synchronizing control of the turbine apparatus as shown in FIG. 13 and the turbine rotational speed synchronizing control from which the simulating results as shown in FIG. 2 is obtained is that the derivative calculation emphasizing setting as described above is brought about in the turbine apparatus as shown in FIG. 13, but is not brought about in the turbine rotational speed synchronizing control from which the simulating results as shown in FIG. 2 is obtained.

Figure 7:
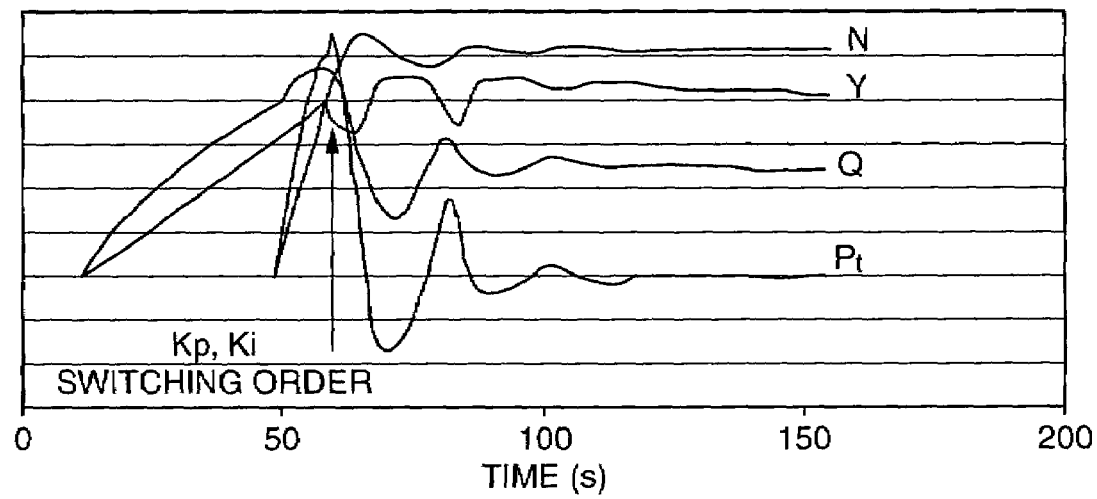
FIG. 7 includes diagrams showing relationships among time (s), opening degree of wicket gate (Y), water flow rate for turbine (Q), turbine output power ($P_t$) and head (H) obtained by analysis on embodiment of the invention when starting in the electric power generating mode.
Figure 7:
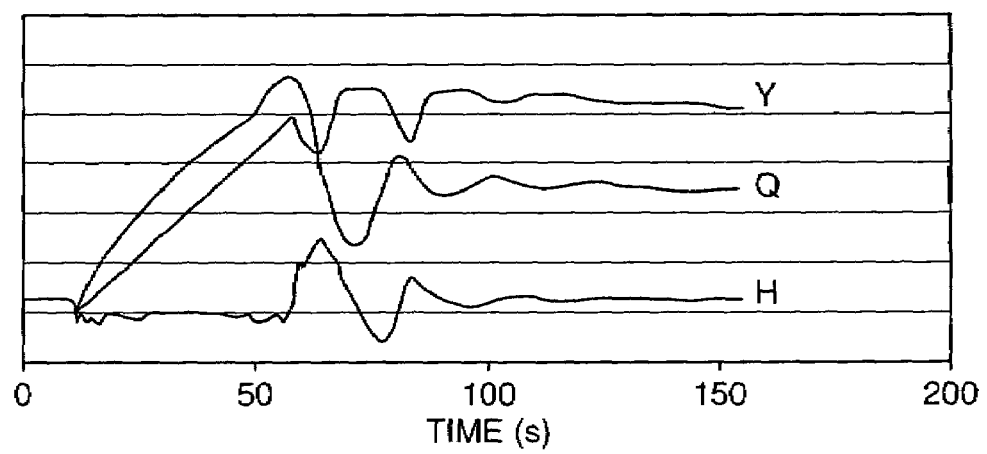
Figure 8:
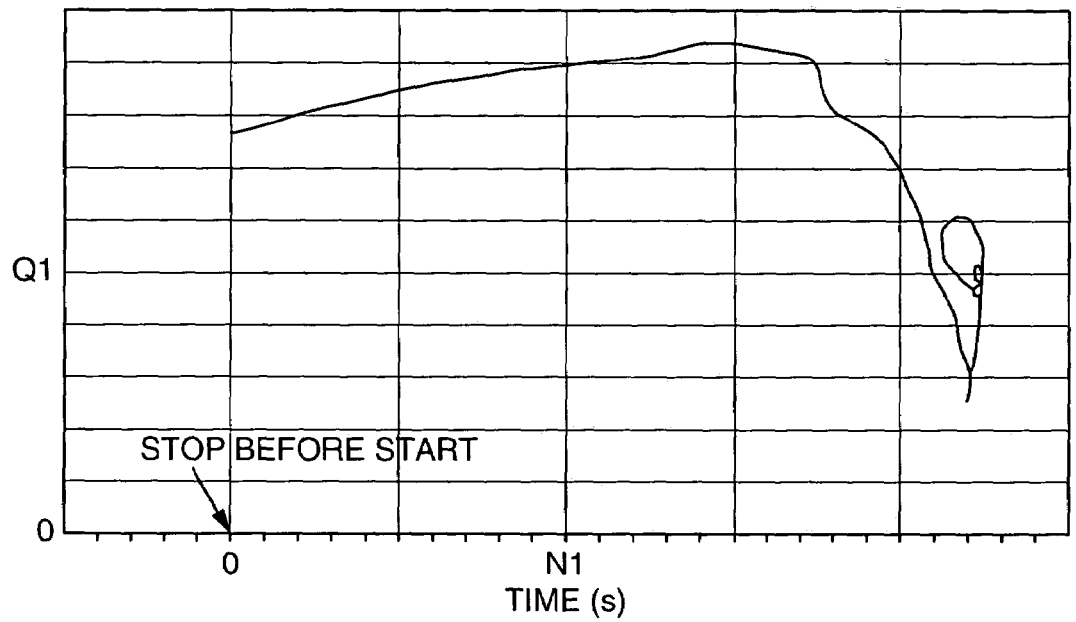
FIG. 8 includes diagrams showing relationships among time (s), unit discharge (Q1), unit speed (N1), rotational speed of runner (N), and outputs ($Z_d$, $Z_p$ and $Z_i$) of derivative, proportional and integration calculation elements obtained by analysis on embodiment of the invention when starting in the electric power generating mode.
Figure 8:
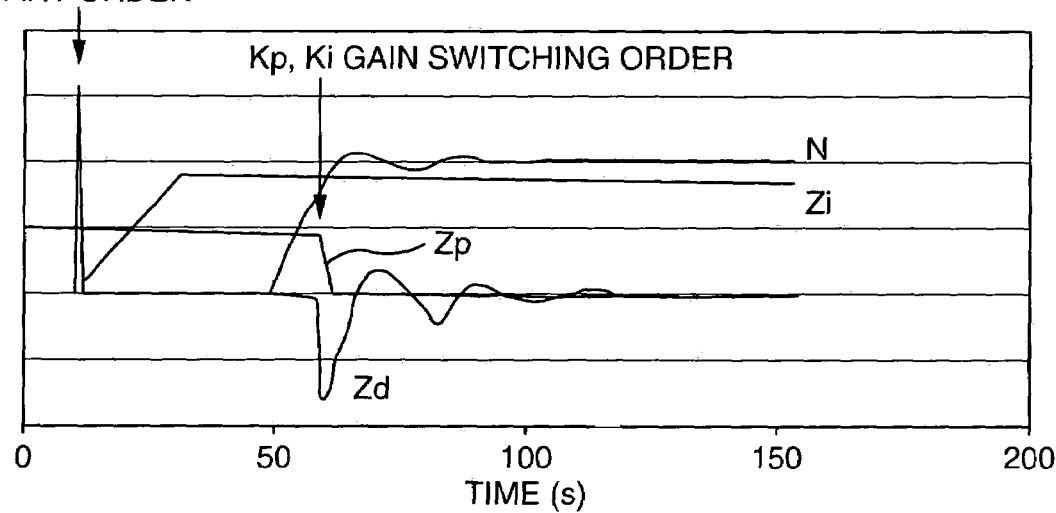
Figure 9:
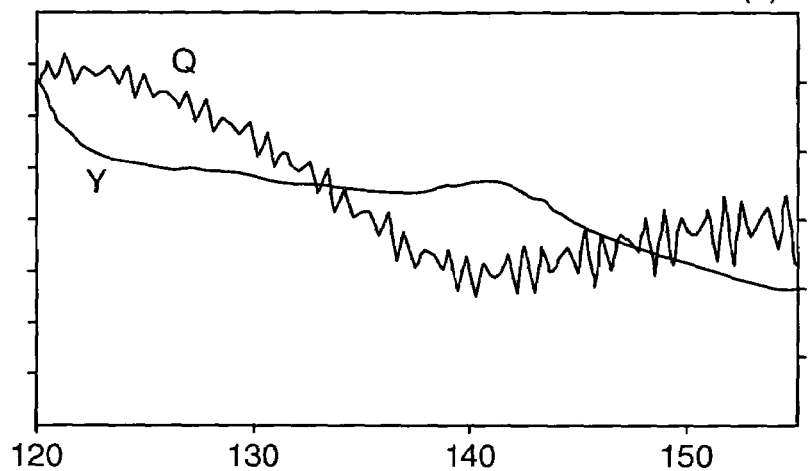
FIG. 9 includes diagrams showing relationships among time (s), water flow rate for turbine (Q), opening degree of wicket gate (Y), rotational speed of runner (N), head (H), and turbine output power ($P_t$) obtained by analysis on embodiment of the invention when starting in the electric power generating mode.
Figure 9:
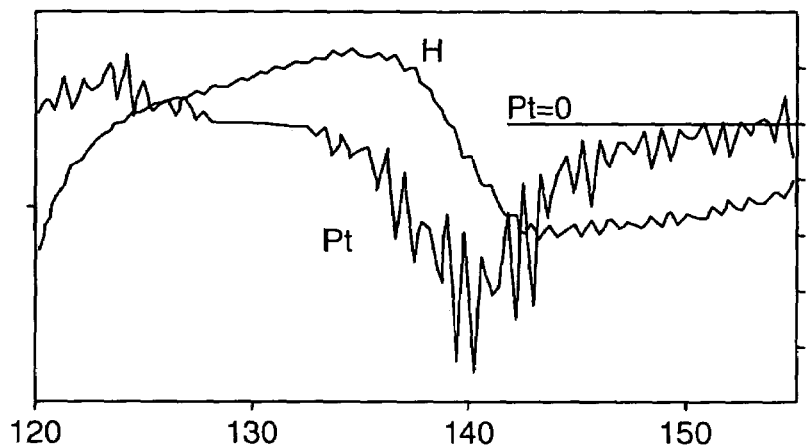
Figure 9:
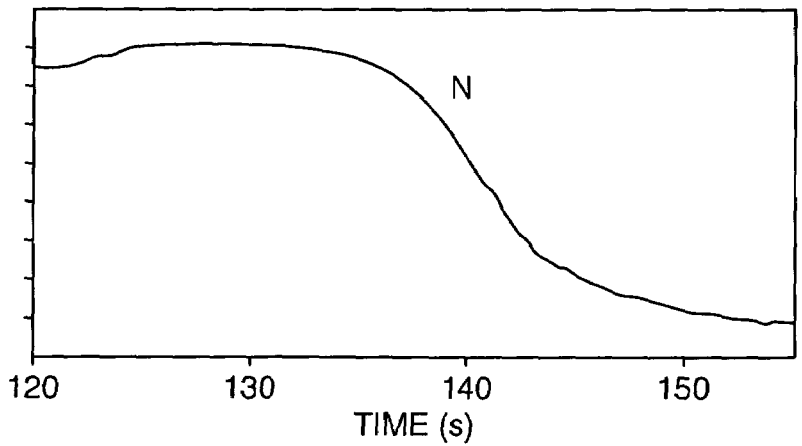
Figure 10:
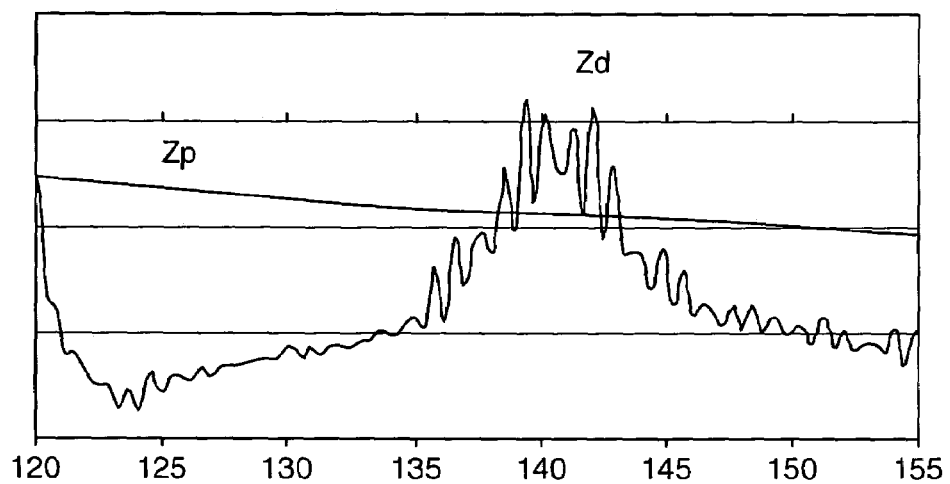
FIG. 10 includes diagrams showing relationships among times, and outputs ($Z_d$, $Z_p$ and $Z_i$) of derivative, proportional and integration calculation elements obtained by analysis on embodiment of the invention when starting in the electric power generating mode.
Figure 10:
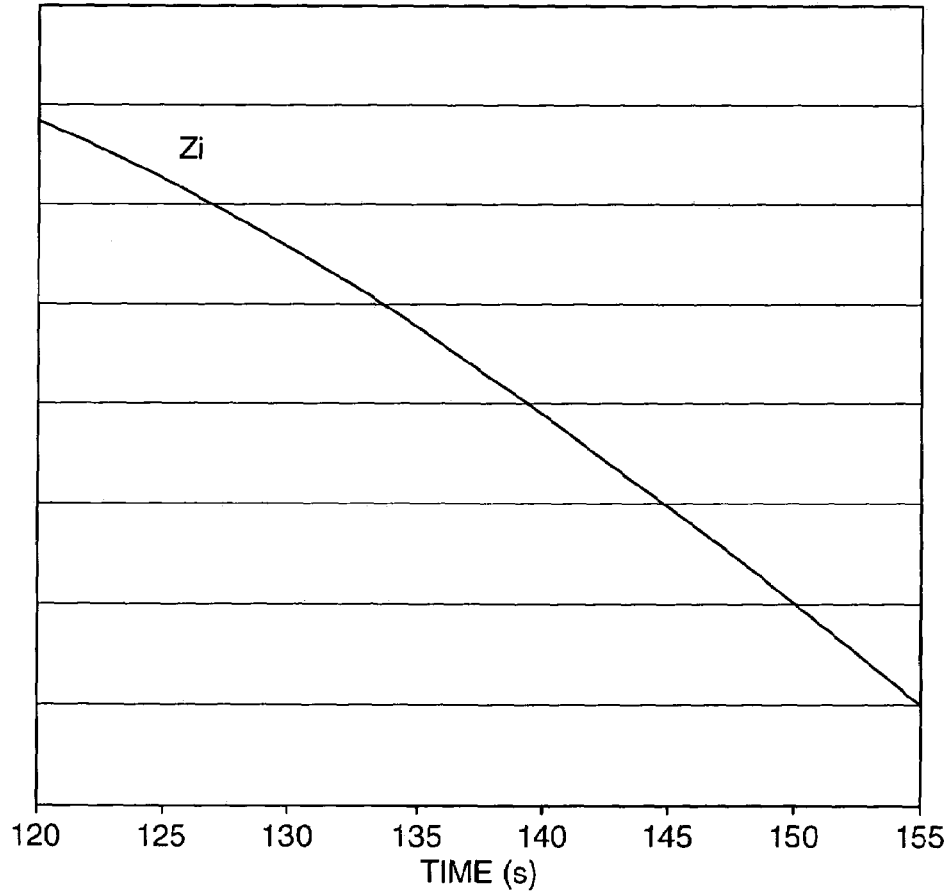
Figure 11:
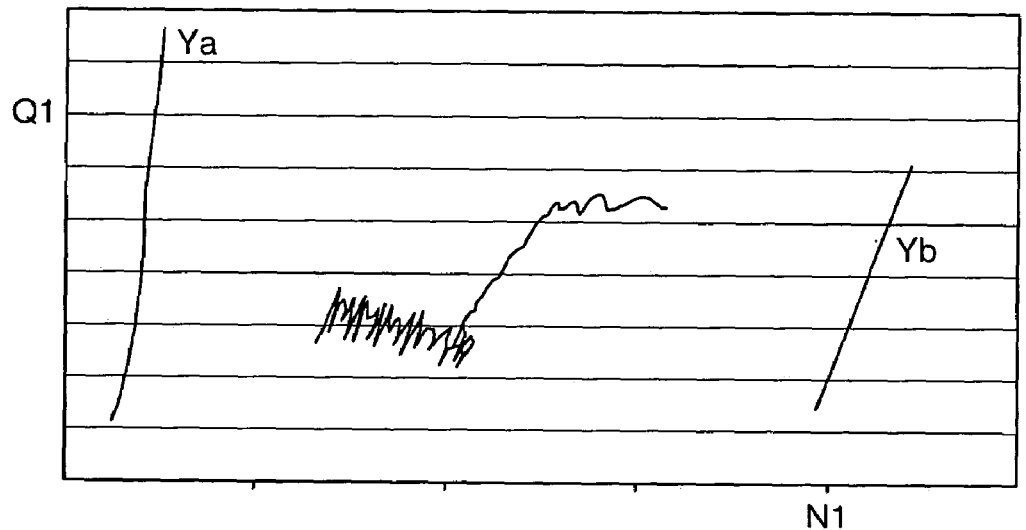
FIG. 11 includes diagrams showing trajectory of operating point of turbine with reference to relationships among unit speed (N1) and unit discharge (Q1) on each of opening degrees of wicket gate (Ya and Yb) obtained by analysis on embodiment of the invention when starting in the electric power generating mode.
Figure 11:
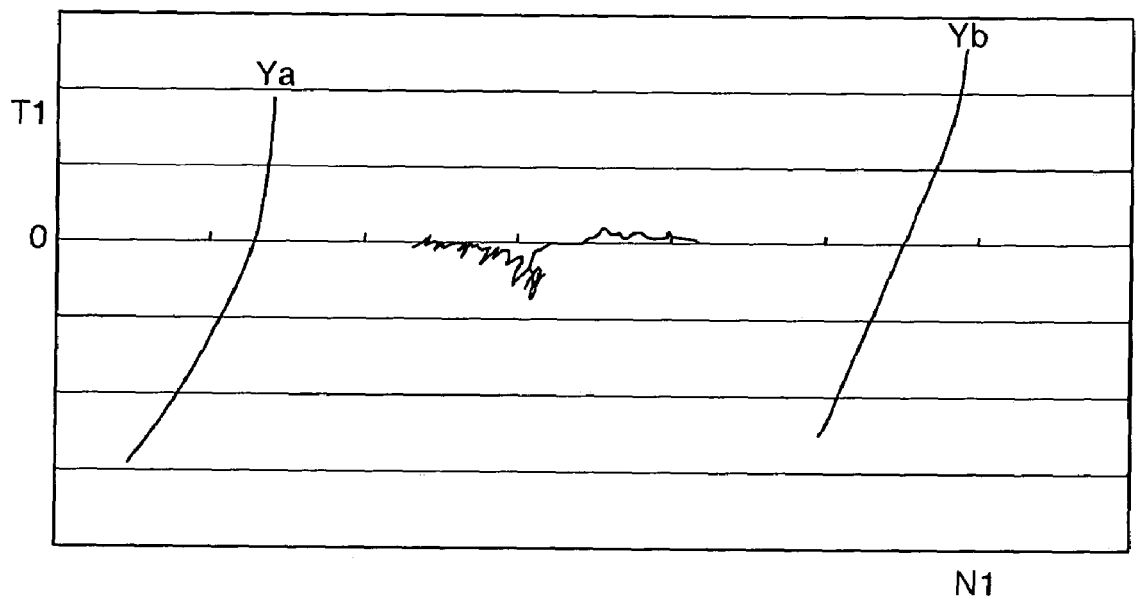

As shown in an upper diagram of FIG. 7, the actual value of the opening degree or area of the wicket gate and the flow rate of the water applied to the turbine start to increase at an elapsed time of 10 seconds, but the actual rotational speed of the turbine is kept at zero until the torque generated by the turbine becomes more than the static frictional torque of the turbine at the elapsed time of 48 seconds. At the elapsed time of 58 seconds, a feed back control of the actual value of the opening degree or area of the wicket gate on the basis of the actual rotational speed of the turbine by the governor is started with Kp=2.3, Ki=0.2 and Kd=12. At the elapsed time of about 60 seconds, in response to that the actual rotational speed of the turbine reaches the predetermined value, Kp is changed from 2.3 to 0.1 and Ki is changed from 0.2 to 0.02 so that the derivative calculation emphasizing setting is performed. Incidentally, the opening degree or area of the wicket gate is prevented from exceeding the starting opening degree thereof by the wicket gate opening degree limiter. At the elapsed time of 120 seconds, the desired or target rotational speed of the turbine is gradually decreased so that the actual rotational speed of the turbine is synchronized with the frequency of the electric power transmission line. As clearly understood from a comparison with the top diagram of FIG. 2 and the upper diagram of FIG. 7, the actual rotational speed of the turbine is completely stable sufficiently for synchronizing the rotation of the turbine with the frequency of the electric power transmission line. As shown in lower diagram of FIG. 7, the actual flow rate of the water is decreased when the opening degree or area of the wicket gate is increased, and the actual flow rate of the water is increased when the opening degree or area of the wicket gate is decreased, that is, the operating point of the turbine is positioned in the reverse flow appearing region of the S-characteristic portion. Further, a variation curve of the opening degree or area of the wicket gate and a variation curve of the effective head or differential pressure across the turbine are reversed with respect to each other. An upper diagram of FIG. 8 shows a variation of the operating point of the turbine from the turbine rotation start to the synchronization of the actual turbine rotation with the desired turbine rotation on the N1-Q1 plane. The operating point of the turbine is converged to a extremely small region in contrast to the third diagram of FIG. 2. As shown in a lower diagram of FIG. 8, after the derivative calculation emphasizing setting, the output Zp of the proportional calculation element becomes substantially zero, and a change of the output Zi of the integration calculation element becomes gradual. Therefore, the difference between the actual rotational speed of the turbine and the target rotational speed of the turbine is minimized mainly by the output Zd of the derivative calculation element. Incidentally, a transition from increase to decrease of the output Zd occurs with a delay in phase angle of about 90 degrees from a transition from increase to decrease of the actual rotational speed of the turbine, and a transition from decrease to increase of the output Zd occurs with a delay in phase angle of about 90 degrees from a transition from decrease to increase of the actual rotational speed of the turbine. As shown in FIG. 9, in response to decrease of the actual rotational speed of the turbine, the opening degree or area of the wicket gate is increased to decrease the flow rate of the water so that the differential pressure across the turbine is increased to restrain or prevent the decrease of the actual rotational speed of the turbine. As shown in FIG. 10, after the derivative calculation emphasizing setting, the changes of the output Zp of the proportional calculation element and the output Zi of the integration calculation element are gradual so that the outputs Zp and Zi are not effective for minimizing the difference between the actual rotational speed of the turbine and the target rotational speed of the turbine, and the difference between the actual rotational speed of the turbine and the target rotational speed of the turbine is minimized mainly by the output Zd of the derivative calculation element. As shown in an upper diagram of FIG. 11, the actual rotational speed of the turbine is gradually decreased to be synchronized with the frequency of the electric power transmission line, and the operating point moves along the flow rate line on no turbine load from right to left. As understood from this diagram, the actual opening degree or area of the wicket gate obtained when the synchronization of the actual rotational speed of the turbine with the frequency of the electric power transmission line is finished is closer to Ya than Yb. Further, from the N1-Q1 curves of Ya and Yb of the opening degree of the wicket gate, it is recognizable that the operating point of the turbine moves in the reverse flow appearing region of the S-characteristic portion. As shown in a lower diagram of FIG. 11, the operating point moves substantially along a line of T1=0 from right to left to be controlled for synchronizing. From the the N1-T1 curves of Ya and Yb of the opening degree of the wicket gate on the N1-T1 plane, it is recognizable that the operating point of the turbine moves in the reverse flow appearing region of the S-characteristic portion.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A turbine apparatus to be driven by a water, comprising a runner rotatable to be rotationally driven by the water, a flow rate adjuster for adjusting a flow rate of the water to change an actual rotational speed of the runner, and a control device for generating a control signal for controlling the flow rate adjuster so that a difference between the actual rotational speed of the runner and a desired rotational speed of the runner is decreased, wherein:

the control device includes an input port for receiving a runner speed signal whose value corresponds to the actual rotational speed of the runner so that an input signal whose value corresponds to the difference between the actual rotational speed of the runner and the desired rotational speed of the runner is generated, a derivative calculation element for generating a derivative component of the control signal whose value corresponds to a value obtained by performing differentiation on the value of the input signal with respect to a time proceeding and an integration calculation element for generating an integral component of the control signal whose value corresponds to a value obtained by performing integration on the value of the input signal with respect to the time proceeding, and a ratio of a gain of the derivative calculation element to a gain of the integration calculation element to be applied to the derivative calculation element and the integration calculation element when the difference between the actual rotational speed of the runner and the desired rotational speed of the runner is not more than a predetermined degree is greater than a ratio of the gain of the derivative calculation element to the gain of the integration calculation element to be applied to the derivative calculation element and the integration calculation element when the difference between the actual rotational speed of the runner and the desired rotational speed of the runner is more than the predetermined degree.

2. A turbine apparatus according to claim 1, wherein:

the ratio of the gain of the derivative calculation element to the gain of the integration calculation element to be applied to the derivative calculation element and the integration calculation element when the difference between the actual rotational speed of the runner and the desired rotational speed of the runner is not more than the predetermined degree is greater than a ratio of the gain of the derivative calculation element to the gain of the integration calculation element to be applied to the derivative calculation element and the integration calculation element when the difference between the actual rotational speed of the runner and the desired rotational speed of the runner is more than the predetermined degree, when a head of the water for driving rotationally the runner is not more than a predetermined value, and the ratio of the gain of the derivative calculation element to the gain of the integration calculation element to be applied to the derivative calculation element and the integration calculation element when the difference between the actual rotational speed of the runner and the desired rotational speed of the runner is not more than the predetermined degree is prevented from being greater than the ratio of the gain of the derivative calculation element to the gain of the integration calculation element to be applied to the derivative calculation element and the integration calculation element when the difference between the actual rotational speed of the runner and the desired rotational speed of the runner is more than the predetermined degree, when the head of the water for driving rotationally the runner is more than the predetermined value.

3. A turbine apparatus according to claim 1, wherein:

when Q is the flow rate of the water for driving rotationally the runner, H is a head of the water for driving rotationally the runner, N is the actual rotational speed of the runner, T is a torque for driving rotationally the runner, $N_1 = N/\sqrt{H}$, $Q_1 = Q/\sqrt{H}$, and $T_1 = T/H$, the ratio of the gain of the derivative calculation element to the gain of the integration calculation element to be applied to the derivative calculation element and the integration calculation element when the difference between the actual rotational speed of the runner and the desired rotational speed of the runner is not more than the predetermined degree is greater than a ratio of the gain of the derivative calculation element to the gain of the integration calculation element to be applied to the derivative calculation element and the integration calculation element when the difference between the actual rotational speed of the runner and the desired rotational speed of the runner is more than the predetermined degree, under at least one of a case in which $\partial Q_1/\partial N_1 > 0$, a case in which $\partial T_1/\partial N_1 > 0$, a case in which an absolute value of $\partial Q_1/\partial N_1$ is more than a first value, and a case in which an absolute value of $\partial T_1/\partial N_1$ is more than a second value, and the ratio of the gain of the derivative calculation element to the gain of the integration calculation element to be applied to the derivative calculation element and the integration calculation element when the difference between the actual rotational speed of the runner and the desired rotational speed of the runner is not more than a predetermined degree is prevented from being greater than the ratio of the gain of the derivative calculation element to the gain of the integration calculation element to be applied to the derivative calculation element and the integration calculation element when the difference between the actual rotational speed of the runner and the desired rotational speed of the runner is more than the predetermined degree, under a case in which $\partial Q_1/\partial N_1 \square 0$, $\partial T_1/\partial N_1 \square 0$, the absolute value of $\partial Q_1/\partial N_1$ is not more than the first value, and the absolute value of $\partial T_1/\partial N_1$ is not more than the second value.

4. A turbine apparatus according to claim 1, wherein during an increase of the actual rotational speed of the runner from zero toward the desired rotational speed of the runner, the ratio of the gain of the derivative calculation element to the gain of the integration calculation element to be applied to the derivative calculation element and the integration calculation element after the difference between the actual rotational speed of the runner and the desired rotational speed of the runner becomes not more than the predetermined degree is greater than the ratio of the gain of the derivative calculation element to the gain of the integration calculation element to be applied to the derivative calculation element and the integration calculation element before the difference between the actual rotational speed of the runner and the desired rotational speed of the runner becomes not more than the predetermined degree.

5. A turbine apparatus according to claim 1, wherein the gain of the derivative calculation element to be applied to the derivative calculation element when the difference between the actual rotational speed of the runner and the desired rotational speed of the runner is not more than the predetermined degree is not less than the gain of the derivative calculation element to be applied to the derivative calculation element when the difference between the actual rotational speed of the runner and the desired rotational speed of the runner is more than the predetermined degree, and the gain of the integration calculation element to be applied to the integration calculation element when the difference between the actual rotational speed of the runner and the desired rotational speed of the runner is not more than the predetermined degree is less than the gain of the integration calculation element to be applied to the integration calculation element when the difference between the actual rotational speed of the runner and the desired rotational speed of the runner is more than the predetermined degree.

6. A turbine apparatus according to claim 1, wherein:
the runner is connectable to an electric power generator to drive the electric power generator, the ratio of the gain of the derivative calculation element to the gain of the integration calculation element to be applied to the derivative calculation element and the integration calculation element when the difference between the actual rotational speed of the runner and the desired rotational speed of the runner is not more than the predetermined degree is greater than a ratio of the gain of the derivative calculation element to the gain of the integration calculation element to be applied to the derivative calculation element and the integration calculation element when the difference between the actual rotational speed of the runner and the desired rotational speed of the runner is more than the predetermined degree, when the electric power generator is prevented from supplying an electric power to electric power transmission lines, and a ratio of the gain of the derivative calculation element to the gain of the integration calculation element to be applied to the derivative calculation element and the integration calculation element when the electric power generator is allowed to supply the electric power to the electric power transmission lines smaller than the ratio of the gain of the derivative calculation element to the gain of the integration calculation element to be applied to the derivative calculation element and the integration calculation element when the difference between the actual rotational speed of the runner and the desired rotational speed of the runner is not more than the predetermined degree and the electric power generator is prevented from supplying the electric power to the electric power transmission lines.

7. A turbine apparatus according to claim 1, wherein the runner is rotatable in either of a normal direction for being driven by the water and a reverse direction for pumping the water when the runner is prevented from being operated to drive the electric power generator.

8. A turbine apparatus according to claim 1, further comprising a proportional calculation element for generating a proportional component of the control signal whose value is proportional to the value of input signal, wherein the control device is a governor in accordance with IEC International Standard 61362 First Edition, the gain of the derivative calculation element is more than 5 and a gain of the proportional calculation element is less than 0.5, when the difference between the actual rotational speed of the runner and the desired rotational speed of the runner is not more than the predetermined degree.

9. A turbine apparatus according to claim 8, wherein the gain of the proportional calculation element is more than 0.6, when the difference between the actual rotational speed of the runner and the desired rotational speed of the runner is more than the predetermined degree.

10. A turbine apparatus according to claim 1, wherein the runner is connectable to an electric power generator to drive the electric power generator, the flow rate of the water for driving the runner is rapidly increased just after the electric power generator is electrically connected to electric power transmission lines to supply the electric power from the electric power generator to the electric power transmission lines after the actual rotational speed of the runner is synchronized in S-characteristic portion of the runner with required frequency of alternating electric current of the electric power transmission lines, from the flow rate of the water for no-load operation in which the runner is rotationally driven by the water when the electric power generator is prevented from supplying the electric power to the electric power transmission lines, so that an operating point of the runner is moved away rapidly from the S-characteristic portion.

11. A turbine apparatus to be driven by a water, comprising a runner rotatable to be rotationally driven by the water, a flow rate adjuster for adjusting a flow rate of the water to change an actual rotational speed of the runner, and a control device for generating a control signal for controlling the flow rate adjuster so that a difference between the actual rotational speed of the runner and a desired rotational speed of the runner is decreased, wherein:
the control device includes an input port for receiving a runner speed signal whose value corresponds to the actual rotational speed of the runner so that an input signal whose value corresponds to the difference between the actual rotational speed of the runner and the desired rotational speed of the runner is generated, a derivative calculation element for generating a derivative component of the control signal whose value corresponds to a value obtained by performing differentiation on the value of the input signal with respect to a time proceeding and an integration calculation element for generating an integral component of the control signal whose value corresponds to a value obtained by performing integration on the value of the input signal with respect to the time proceeding, and
when Q is the flow rate of the water for driving rotationally the runner, H is a head of the water for driving rotationally the runner, N is the actual rotational speed of the runner, T is a torque for driving rotationally the runner, $N_1 = N/\sqrt{H}$, $Q_1 = Q/\sqrt{H}$, and $T_1 = T/H$,
under at least one of a case in which $\partial Q_1/\partial N_1 > 0$, a case in which $\partial T_1/\partial N_1 > 0$, a case in which the absolute value of $\partial Q_1/\partial N_1$ is more than the first value, and a case in which the absolute value of $\partial T_1/\partial N_1$ is more than the second value, a transition from increase to decrease of an opening area of the flow rate adjuster occurs with a delay in phase angle not more than 120 degrees from a transition from increase to decrease of the actual rotational speed of the runner.

12. A turbine apparatus to be driven by a water, comprising a runner rotatable to be rotationally driven by the water, a flow rate adjuster for adjusting a flow rate of the water to change an actual rotational speed of the runner, and a control device for generating a control signal for controlling the flow rate adjuster so that a difference between the actual rotational speed of the runner and a desired rotational speed of the runner is decreased, wherein:
the control device includes an input port for receiving a runner speed signal whose value corresponds to the actual rotational speed of the runner so that an input signal whose value corresponds to the difference between the actual rotational speed of the runner and the desired rotational speed of the runner is generated, a derivative calculation element for generating a derivative component of the control signal whose value corresponds to a value obtained by performing differentiation on the value of the input signal with respect to a time proceeding and an integration calculation element for generating an integral component of the control signal whose value corresponds to a value obtained by performing integration on the value of the input signal with respect to the time proceeding, and
when Q is the flow rate of the water for driving rotationally the runner, H is a head of the water for driving rotationally the runner, N is the actual rotational speed of the runner, T is a torque for driving rotationally the runner, $N_1=N/\sqrt{H}$, $Q_1=Q/\sqrt{H}$, and $T_1=T/H$, under at least one of a case in which $\partial Q_1/\partial N_1>0$, a case in which $\partial T_1/\partial N_1>0$, a case in which an absolute value of $\partial Q_1/\partial N_1$ is more than a first value, and a case in which an absolute value of $\partial T_1/\partial N_1$ is more than the second value, a transition from decrease to increase of the opening area of the flow rate adjuster occurs with a delay in phase angle not more than 120 degrees from a transition from decrease to increase of the actual rotational speed of the runner.

13. A governor for adjusting a flow rate of a water to change an actual rotational speed of a runner rotationally driven by the water, comprising a control device for generating a control signal corresponding to the flow rate of the water to be applied to the runner in such a manner that a difference between an actual rotational speed of the runner and a desired rotational speed of the runner is decreased, wherein:

the control device includes an input port for receiving a runner speed signal whose value corresponds to the actual rotational speed of the runner so that an input signal whose value corresponds to the difference between the actual rotational speed of the runner and the desired rotational speed of the runner is generated, a derivative calculation element for generating a derivative component of the control signal whose value corresponds to a value obtained by performing differentiation on the value of the input signal with respect to a time proceeding and an integration calculation element for generating an integral component of the control signal whose value corresponds to a value obtained by performing integration on the value of the input signal with respect to the time proceeding, and a ratio of a gain of the derivative calculation element to a gain of the integration calculation element to be applied to the derivative calculation element and the integration calculation element when the difference between the actual rotational speed of the runner and the desired rotational speed of the runner is not more than a predetermined degree is greater than a ratio of the gain of the derivative calculation element to the gain of the integration calculation element to be applied to the derivative calculation element and the integration calculation element when the difference between the actual rotational speed of the runner and the desired rotational speed of the runner is more than the predetermined degree.

14. A turbine apparatus to be driven by a water, comprising a runner rotatable to be rotationally driven by the water, a flow rate adjuster for adjusting a flow rate of the water to change an actual rotational speed of the runner, and a control device for generating a control signal for controlling the flow rate adjuster so that a difference between the actual rotational speed of the runner and a desired rotational speed of the runner is decreased, wherein:

the control device includes an input port for receiving a runner speed signal whose value corresponds to the actual rotational speed of the runner so that an input signal whose value corresponds to the difference between the actual rotational speed of the runner and the desired rotational speed of the runner is generated, a derivative calculation element for generating a derivative component of the control signal whose value corresponds to a value obtained by performing differentiation on the value of the input signal with respect to a time proceeding and an integration calculation element for generating an integral component of the control signal whose value corresponds to a value obtained by performing integration on the value of the input signal with respect to the time proceeding, and a ratio of a gain of the derivative calculation element to a gain of the integration calculation element to be applied to the derivative calculation element and the integration calculation element when a head of the water for driving rotationally the runner is not more than a predetermined value is greater than a ratio of the gain of the derivative calculation element to the gain of the integration calculation element to be applied to the derivative calculation element and the integration calculation element when the head of the water for driving rotationally the runner is more than the predetermined value.

15. A turbine apparatus to be driven by a water, comprising a runner rotatable to be rotationally driven by the water, a flow rate adjuster for adjusting a flow rate of the water to change an actual rotational speed of the runner, and a control device for generating a control signal for controlling the flow rate adjuster so that a difference between the actual rotational speed of the runner and a desired rotational speed of the runner is decreased, wherein:

the control device includes an input port for receiving a runner speed signal whose value corresponds to the actual rotational speed of the runner so that an input signal whose value corresponds to the difference between the actual rotational speed of the runner and the desired rotational speed of the runner is generated, a derivative calculation element for generating a derivative component of the control signal whose value corresponds to a value obtained by performing differentiation on the value of the input signal with respect to a time proceeding and an integration calculation element for generating an integral component of the control signal whose value corresponds to a value obtained by performing integration on the value of the input signal with respect to the time proceeding, and when Q is the flow rate of the water for driving rotationally the runner, H is a head of the water for driving rotationally the runner, N is the actual rotational speed of the runner, T is a torque for driving rotationally the runner, $N_1=N/\sqrt{H}$, $Q_1=Q/\sqrt{H}$, and $T_1=T/H$, a ratio of a gain of the derivative calculation element to a gain of the integration calculation element to be applied to the derivative calculation element and the integration calculation element under at least one of a case in which $\partial Q_1/\partial N_1>0$, a case in which $\partial T_1/\partial N_1>0$, a case in which an absolute value of $\partial Q_1/\partial N_1$ is more than a first value, and a case in which an absolute value of $\partial T_1/\partial N_1$ is more than a second value is greater than a ratio of the gain of the derivative calculation element to the gain of the integration calculation element to be applied to the derivative calculation element and the integration calculation element under a case in which $\partial Q_1/\partial N_1 \square 0$, $\partial T_1/\partial N_1 \square 0$, the absolute value of $\partial Q_1/\partial N_1$ is not more than the first value, and the absolute value of $\partial T_1/\partial N_1$ is not more than the second value.

16. A turbine apparatus to be driven by a water, comprising a runner rotatable to be rotationally driven by the water, a flow rate adjuster for adjusting a flow rate of the water by changing an opening area of the flow rate adjuster so that an actual rotational speed of the runner is changed, and a control device for generating a control signal corresponding to an opening area of the flow rate adjuster in such a manner that a difference between the actual rotational speed of the runner and a desired rotational speed of the runner is decreased, wherein:

the control device includes an input port for receiving a runner speed signal whose value corresponds to the actual rotational speed of the runner so that an input signal whose value corresponds to the difference between the actual rotational speed of the runner and the desired rotational speed of the runner is generated, and when Q is the flow rate of the water for driving rotationally the runner, H is a head of the water for driving rotationally the runner, N is the actual rotational speed of the runner, T is a torque for driving rotationally the runner, $N_1 = N/\sqrt{H}$, $Q_1 = Q/\sqrt{H}$, and $T_1 = T/H$, a variation of the control signal is in advance of a variation of the input signal under at least one of a case in which $\partial Q_1/\partial N_1 > 0$, a case in which $\partial T_1/\partial N_1 > 0$, a case in which an absolute value of $\partial Q_1/\partial N_1$ is more than a first value, and a case in which an absolute value of $\partial T_1/\partial N_1$ is more than a second value.

17. A turbine apparatus according to claim 16, wherein the variation of the control signal is in advance of the variation of the input signal by 30–90 degrees in phase angle.

18. A turbine apparatus to be driven by a water, comprising a runner rotatable to be rotationally driven by the water, a flow rate adjuster for adjusting a flow rate of the water to change an actual rotational speed of the runner, and a control device for generating a control signal corresponding to an opening area of the flow rate adjuster in such a manner that a difference between the actual rotational speed of the runner and a desired rotational speed of the runner is decreased, wherein:

the control device includes an input port for receiving a runner speed signal whose value corresponds to the actual rotational speed of the runner so that an input signal whose value corresponds to the difference between the actual rotational speed of the runner and the desired rotational speed of the runner is generated, a derivative calculation element for generating a derivative component of the control signal whose value corresponds to a value obtained by performing differentiation on the value of the input signal with respect to a time proceeding and an integration calculation element for generating an integral component of the control signal whose value corresponds to a value obtained by performing integration on the value of the input signal with respect to the time proceeding, and when Q is the flow rate of the water for driving rotationally the runner, H is a head of the water for driving rotationally the runner, N is the actual rotational speed of the runner, T is a torque for driving rotationally the runner, $N_1 = N/\sqrt{H}$, $Q_1 = Q/\sqrt{H}$, and $T_1 = T/H$, a ratio of a gain of the derivative calculation element to a gain of the integration calculation element to be applied to the derivative calculation element and the integration calculation element when the difference between the actual rotational speed of the runner and the desired rotational speed of the runner is not more than a predetermined degree is determined in such a manner that a variation of the control signal is in advance of a variation of the input signal under at least one of a case in which $\partial Q_1/\partial N_1 > 0$, a case in which $\partial T_1/\partial N_1 > 0$, a case in which an absolute value of $\partial Q_1/\partial N_1$ is more than a first value, and a case in which an absolute value of $\partial T_1/\partial N_1$ is more than a second value.

19. A turbine apparatus according to claim 18, wherein the variation of the control signal is in advance of the variation of the input signal by 30–90 degrees in phase angle.

20. A turbine apparatus according to claim 18, further comprising a proportional calculation element for generating a proportional component of the control signal whose value is proportional to the value of input signal, wherein a ratio of a gain of the derivative calculation element to a gain of the proportional calculation element to be applied to the derivative calculation element and the proportional calculation element when the difference between the actual rotational speed of the runner and the desired rotational speed of the runner is not more than the predetermined degree is determined in such a manner that the variation of the control signal is in advance of the variation of the input signal under at least one of a case in which $\partial Q_1/\partial N_1 > 0$, a case in which $\partial T_1/\partial N_1 > 0$, a case in which an absolute value of $\partial Q_1/\partial N_1$ is more than a first value, and a case in which an absolute value of $\partial T_1/\partial N_1$ is more than a second value.

* * * * *